(12) United States Patent
Xu et al.

(10) Patent No.: US 10,917,151 B2
(45) Date of Patent: Feb. 9, 2021

(54) ELECTRONIC DEVICE AND METHOD IN WIRELESS COMMUNICATION SYSTEM, AND WIRELESS COMMUNICATION SYSTEM

(71) Applicant: Sony Corporation, Tokyo (JP)

(72) Inventors: Jin Xu, Beijing (CN); Cheng Gao, Beijing (CN); Siqi Liu, Beijing (CN); Chaonan He, Beijing (CN); Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/023,392

(22) Filed: Sep. 17, 2020

(65) Prior Publication Data

US 2021/0006307 A1 Jan. 7, 2021

Related U.S. Application Data

(60) Continuation of application No. 16/809,560, filed on Mar. 5, 2020, now Pat. No. 10,804,986, which is a
(Continued)

(30) Foreign Application Priority Data

Aug. 19, 2016 (CN) .......................... 2016 1 0694565

(51) Int. Cl.
*H04B 7/0456* (2017.01)
*H04B 7/04* (2017.01)
(Continued)

(52) U.S. Cl.
CPC ............ *H04B 7/0456* (2013.01); *H04B 7/04* (2013.01); *H04B 7/0478* (2013.01); *H04B 7/063* (2013.01);
(Continued)

(58) Field of Classification Search
CPC ... H04L 5/0048; H04L 25/0224; H04L 5/005; H04L 5/0051; H04W 24/08; H04B 7/04;
(Continued)

(56) References Cited

U.S. PATENT DOCUMENTS 8,750,358 B2 6/2014 Yue et al.
9,325,475 B2 * 4/2016 Hoshino ............... H04L 1/0026
(Continued)

FOREIGN PATENT DOCUMENTS

CN 101599814 A 12/2009
CN 101998327 A 3/2011
(Continued)

OTHER PUBLICATIONS

International Search Report dated Oct. 24, 2017 for PCT/CN2017/093807 filed on Jul. 21, 2017, 8 pages including English translation.

*Primary Examiner* — Khanh C Tran
(74) *Attorney, Agent, or Firm* — Xsensus LLP

(57) ABSTRACT

An electronic device at a base station end includes a processing circuit, the processing circuit being configured to: configure, in response to request signalling from a user equipment, an aperiodic beam-forming reference signal relevant to a first beam group for the user equipment, wherein the first beam group is determined by a base station according to channel state information periodically fed back by the user equipment; generate downlink control information, so as to indicate that the user equipment feeds back beam selection information according to the aperiodic beam-forming reference signal; determine, according to the beam selection information, one or a plurality of candidate beams and one or a plurality of corresponding second pre-coding codebooks; and determine an effective pre-coding codebook based on the one or multiple second pre-coding codebooks.

10 Claims, 17 Drawing Sheets

Related U.S. Application Data division of application No. 16/314,661, filed as application No. PCT/CN2017/093807 on Jul. 21, 2017, now Pat. No. 10,630,354.

(51) Int. Cl.
  *H04B 7/06* (2006.01)
  *H04W 24/08* (2009.01)

(52) U.S. Cl.
  CPC ............ *H04B 7/065* (2013.01); *H04B 7/0639* (2013.01); *H04B 7/0647* (2013.01); *H04B 7/0695* (2013.01); *H04W 24/08* (2013.01)

(58) Field of Classification Search
  CPC .... H04B 7/0456; H04B 7/0478; H04B 7/063; H04B 7/0639; H04B 7/0647; H04B 7/065; H04B 7/0695
  See application file for complete search history.

(56) References Cited

U.S. PATENT DOCUMENTS

| | | | | |
|---|---|---|---|---|
| 2012/0163208 | A1* | 6/2012 | Kamble | H04W 72/1231 370/252 |
| 2013/0196699 | A1* | 8/2013 | Davydov | H04L 5/0035 455/500 |
| 2013/0201912 | A1* | 8/2013 | Sheng | H04B 7/0634 370/328 |
| 2013/0208604 | A1 | 8/2013 | Lee et al. | |
| 2014/0376653 | A1* | 12/2014 | Xu | H04L 25/03898 375/267 |
| 2015/0078474 | A1* | 3/2015 | Mazzarese | H04B 7/0632 375/267 |
| 2015/0382205 | A1 | 12/2015 | Lee et al. | |
| 2015/0382379 | A1* | 12/2015 | Kim | H04W 74/006 370/329 |
| 2016/0142189 | A1 | 5/2016 | Shin et al. | |
| 2016/0149629 | A1 | 5/2016 | Zhang et al. | |
| 2016/0219570 | A1 | 7/2016 | Guo et al. | |
| 2016/0330004 | A1* | 11/2016 | Kim | H04L 5/0048 |
| 2017/0041923 | A1 | 2/2017 | Park | |
| 2017/0317731 | A1 | 11/2017 | Chan et al. | |
| 2018/0262244 | A1 | 9/2018 | Noh et al. | |
| 2018/0269950 | A1 | 9/2018 | Wilson et al. | |
| 2019/0036585 | A1 | 1/2019 | Hosseini et al. | |
| 2019/0045494 | A1 | 2/2019 | Ho et al. | |
| 2019/0116594 | A1 | 4/2019 | Kwak et al. | |
| 2019/0124539 | A1 | 4/2019 | Kim et al. | |
| 2019/0268938 | A1 | 8/2019 | Zhao et al. | |
| 2019/0320463 | A1* | 10/2019 | Yamada | H04W 16/14 |

FOREIGN PATENT DOCUMENTS

| | | |
|---|---|---|
| CN | 102710388 A | 10/2012 |
| CN | 105322995 A | 2/2016 |

\* cited by examiner

ELECTRONIC DEVICE AND METHOD IN WIRELESS COMMUNICATION SYSTEM, AND WIRELESS COMMUNICATION SYSTEM

CROSS-REFERENCE TO RELATED APPLICATIONS

The present application is a continuation of U.S. application Ser. No. 16/809,560, filed Mar. 5, 2020, which is a divisional of U.S. application Ser. No. 16/314,661, filed Jan. 1, 2019 (now U.S. Pat. No. 10,630,354), which is based on PCT filing PCT/CN2017/093807, filed Jul. 21, 2017, which claims priority to CN 201610694565.3, filed Aug. 19, 2016, each of which is incorporated herein by reference in its entirety.

FIELD OF THE INVENTION

The present disclosure relates to the field of wireless communication technology, and particularly to an electronic device and method for selectively adjusting a Precoding Matrix Indicator (PMI) fed back by a user equipment in a wireless communication system, and a wireless communication system.

BACKGROUND OF THE INVENTION

As the main target of R14, 3D Multi-Input Multi-Output (3D MIMO) enhancement mainly comprises improving the robustness of an actual deployment scenario, which at least shall include a high speed deployment scenario.

In a high speed scenario, it is generally recommended to use a larger measurement and report period, because a PMI with a short report period will cause a performance loss due to quick changes in channels. However, in this case, in view of measurement and feedback latency, Channel State Information (CSI) fed back by a user possibly fails to precisely reflect channel states. The CSI generally comprises information such as PMI, Channel Quality Indicator (CQI), Rank Indicator (RI) and the like. That is, the PMI fed back is possibly expired, which will cause a mismatched precoding strategy. Thus, it is desired to make it possible to provide a solution capable of adjusting the PMI fed back, so as to solve the problem of expiration of the PMI in the high speed scenario.

SUMMARY OF THE INVENTION

A brief summary of the present disclosure is given below to provide a basic understanding of some aspects of the present disclosure. However, it should be understood that the summary is not an exhaustive summary of the present disclosure. It does not intend to define a key or important part of the present disclosure, nor does it intend to limit the scope of the present disclosure. The object of the summary is only to briefly present some concepts of the present disclosure, which serves as a preamble of the more detailed description that follows.

In view of the foregoing problem, an object of at least one aspect of the present disclosure is to provide an electronic device and method in a wireless communication system, and a wireless communication system, which are capable of triggering, according to a communication quality of a user equipment, selective adjustment on a PMI fed back by the user equipment.

According to an aspect of the present disclosure, there is provided an electronic device at base station end in a wireless communication system, the electronic device comprising a processing circuitry configured to: configure, in response to a request signaling from a user equipment, a non-periodic beamformed reference signal related to a first beam group for the user equipment, the first beam group being determined by the base station according to channel state information periodically fed back by the user equipment; generate downlink control information to instruct the user equipment to feed back beam selection information according to the non-periodic beamformed reference signal; determine, according to the beam selection information, one or more candidate beams and one or more second precoding codebooks corresponding to the one or more candidate beams; and determine an effective precoding codebook based on the one or more second precoding codebooks.

According to another aspect of the present disclosure, there is further provided an electronic device at user equipment end in a wireless communication system, the electronic device comprising a processing circuitry configured to: determine whether a communication quality between the user equipment and a base station is lower than a predetermined threshold; generate, in a case where it is determined that the communication quality is lower than the predetermined threshold, a request signaling to be sent to the base station, to request the base station to configure a non-periodic beamformed reference signal related to a first beam group for the user equipment, the first beam group being determined by the base station according to channel state information periodically fed back by the user equipment; and generate, in response to downlink control information from the base station, beam selection information to be sent to the base station according to the non-periodic beamformed reference signal, for the base station to determine an effective precoding codebook based on the beam selection information.

According to another aspect of the present disclosure, there is further provided a wireless communication system comprising: a user equipment comprising a first processing circuitry configured to: determine whether a communication quality between the user equipment and a base station is lower than a predetermined threshold, generate, in a case where it is determined that the communication quality is lower than the predetermined threshold, a request signaling to be sent to the base station, and generate, in response to downlink control information from the base station, beam selection information to be sent to the base station according to a non-periodic beamformed reference signal; and the base station comprising a second processing circuitry configured to: configure, in response to the request signaling, a non-periodic beamformed reference signal related to a first beam group for the user equipment, the first beam group being determined by the base station according to channel state information periodically fed back by the user equipment, generate the downlink control information to instruct the user equipment to feed back the beam selection information, determine, according to the beam selection information, one or more candidate beams and one or more second precoding codebooks corresponding to the one or more candidate beams, and determine an effective precoding codebook based on the one or more second precoding codebooks.

According to another aspect of the present disclosure, there is further provided a method at base station end in a wireless communication system, the method comprising: configuring, in response to a request signaling from a user equipment, a non-periodic beamformed reference signal related to a first beam group for the user equipment, the first beam group being determined by the base station according to channel state information periodically fed back by the user equipment; generating downlink control information to instruct the user equipment to feed back beam selection information according to the non-periodic beamformed reference signal; determining, according to the beam selection information, one or more candidate beams and one or more second precoding codebooks corresponding to the one or more candidate beams; and determining an effective precoding codebook based on the one or more second precoding codebooks.

According to another aspect of the present disclosure, there is further provided a method at user equipment end in a wireless communication system, the method comprising: determining whether a communication quality between the user equipment and a base station is lower than a predetermined threshold; generating, in a case where it is determined that the communication quality is lower than the predetermined threshold, a request signaling to be sent to the base station, to request the base station to configure a non-periodic beamformed reference signal related to a first beam group for the user equipment, the first beam group being determined by the base station according to channel state information periodically fed back by the user equipment; and generating, in response to downlink control information from the base station, beam selection information to be sent to the base station according to the non-periodic beamformed reference signal, for the base station to determine an effective precoding codebook based on the beam selection information.

According to another aspect of the present disclosure, there is further provided an electronic device at base station end in a wireless communication system, the electronic device comprising a processing circuitry configured to: configure, in response to a request signaling from a user equipment, a non-periodic beamformed reference signal related to a first beam group for the user equipment, the first beam group being determined by the base station according to channel state information periodically fed back by the user equipment; and generate downlink control information to instruct the user equipment to feed back a non-periodic Precoding Matrix Indicator according to the non-periodic beamformed reference signal.

According to another aspect of the present disclosure, there is further provided an electronic device at user equipment end in a wireless communication system, the electronic device comprising a processing circuitry configured to: determine whether a communication quality between the user equipment and a base station is lower than a predetermined threshold; and generate, in a case where it is determined that the communication quality is lower than the predetermined threshold, a request signaling to be sent to the base station, to request the base station to configure a non-periodic beamformed reference signal related to a first beam group for the user equipment, the first beam group being determined by the base station according to channel state information periodically fed back by the user equipment.

According to other aspects of the present disclosure, there is further provided a computer program code and a computer program product for implementing the foregoing methods according to the present disclosure, and a computer readable storage medium having stored thereon the computer program code for implementing the foregoing methods according to the disclosure.

According to embodiments of the present disclosure, by selectively triggering, according to a communication quality of a user equipment, a base station to send a non-periodic beamformed reference signal so as to selectively adjust a PMI fed back by the user equipment, it is made possible to avoid the problem of mismatching a precoding strategy caused by an expired PMI, thereby optimizing the system performance.

Other aspects of embodiments of the present disclosure will be given in the following specification part, wherein preferred embodiments for sufficiently disclosing embodiments of the present disclosure are described in detail, without applying limitations thereto.

BRIEF DESCRIPTION OF THE DRAWINGS

The present disclosure can be better understood with reference to the detailed description given in conjunction with the appended drawings below, wherein throughout the drawings, same or similar reference signs are used to represent same or similar components. The appended drawings, together with the detailed descriptions below, are incorporated in the specification and form a part of the specification, to further describe preferred embodiments of the present disclosure and explain the principles and advantages of the present disclosure by way of examples. In the appended drawings.

EMBODIMENTS OF THE INVENTION

Hereinafter, exemplary embodiments of the present disclosure will be described in detail in conjunction with the appended drawings. For the sake of clarity and conciseness, the specification does not describe all features of actual embodiments. However, it should be understood that in developing any such actual embodiment, many decisions specific to the embodiments must be made, so as to achieve specific objects of a developer; for example, those limitation conditions related to the system and services are met, and these limitation conditions possibly would vary as embodiments are different. In addition, it should be appreciated that although developing tasks are possibly complicated and time-consuming, such developing tasks are only routine tasks for those skilled in the art benefiting from the contents of the present disclosure.

It should also be noted herein that, to avoid the present disclosure from being obscured due to unnecessary details, only those device structures and/or processing steps closely related to the solution according to the present disclosure are shown in the appended drawings, while omitting other details not closely related to the present disclosure.

Next, embodiments of the present disclosure will be described in detail with reference to FIG. 1 through FIG. 21.

Figure 1:
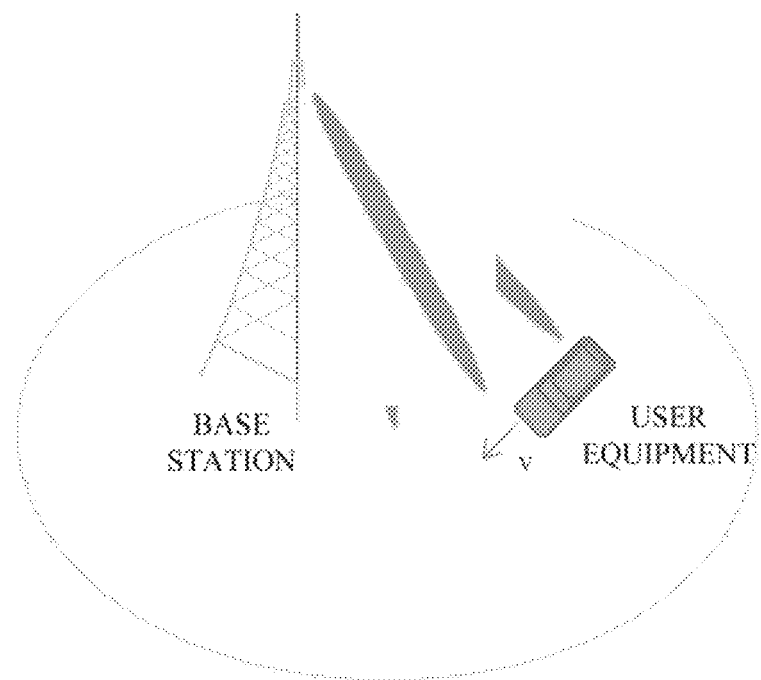
FIG. 1 is a schematic view showing a high speed deployment scenario.

FIG. 1 is a schematic view showing a high speed deployment scenario. As shown in FIG. 1, in the high speed deployment scenario, a user equipment (which for example is an in-vehicle device in the example as shown in FIG. 1) is in movement at speed V. As described above, in a high speed scenario, due to quick changes in channels, it is general to configure a larger measurement and report period. However, such vehicle and feedback latency will cause a possibility of expiration of a PMI fed back by the user equipment; that is, a PMI fed back by the user equipment at a current time possibly reflects a channel state at a previous time whereas at this time the user equipment has moved to a next position, and thus the PMI fed back fails to precisely reflect a channel state of the current time. Accordingly, a mismatched precoding strategy will be caused.

One of the objects of the present invention is to propose a solution for such a problem. A technical solution according to an embodiment of the present disclosure will be described as an example in detail below.

Figure 2:
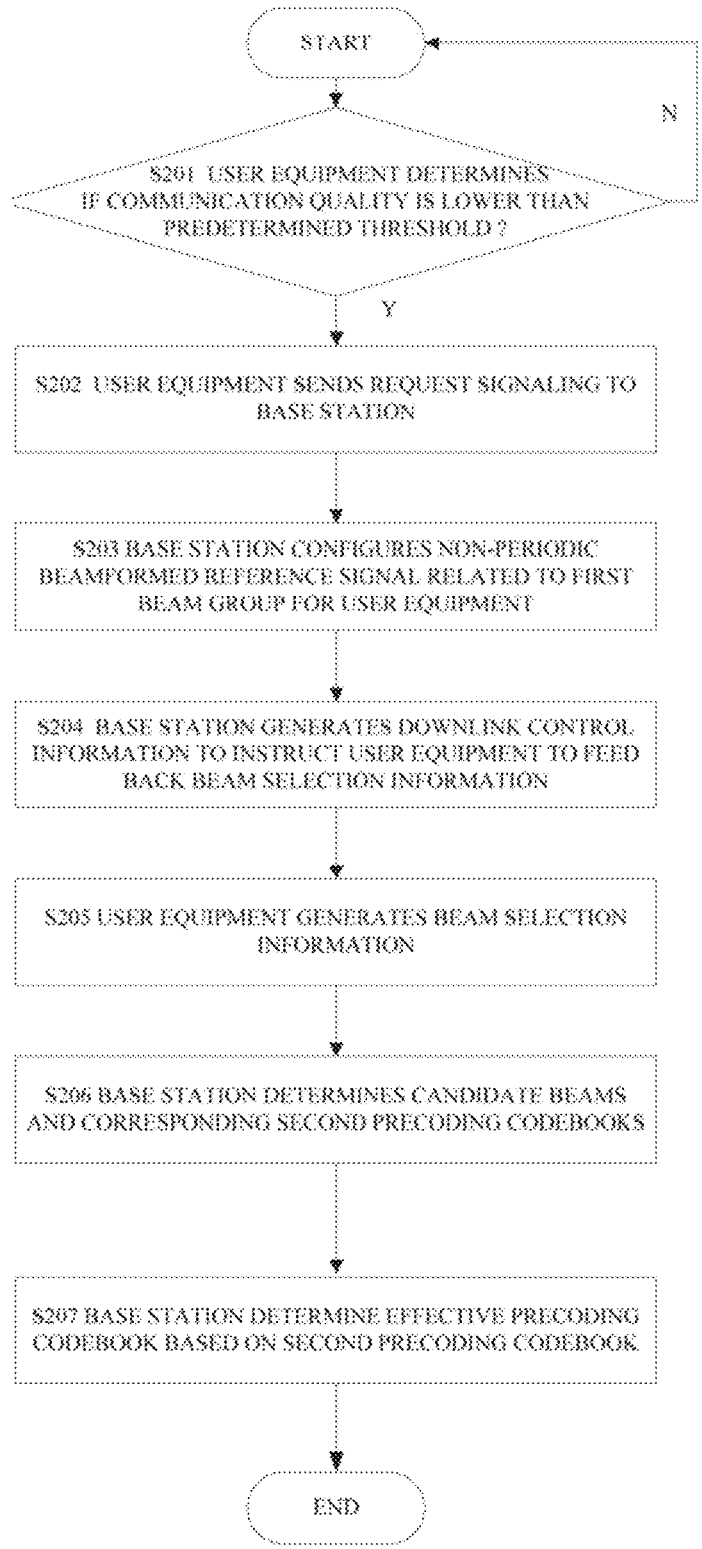
FIG. 2 is an overall flowchart showing an exemplary process of a PMI adjustment solution according to an embodiment of the present disclosure.

First, an overall concept of a PMI adjustment solution according to an embodiment of the present disclosure will be described with reference to FIG. 2. FIG. 2 is an overall flowchart showing an exemplary process of a PMI adjustment solution according to an embodiment of the present disclosure.

As shown in FIG. 2, first, in step S201, a user equipment determines whether a communication quality between the user equipment and a base station is lower than a predetermined threshold.

The user equipment will periodically evaluate the communication quality of itself. The communication quality for example may be evaluated by one or more of QoS (Quality of Service), CQI (Channel Quality Information), RSRP (Reference Signal Receiving Power) and RSRQ (Reference Signal Receiving Quality) and the like. If the user equipment determines that the communication quality at this time is lower than the predetermined threshold, it is indicated that the precoding strategy at this time is possibly improper, that is, it is indicated that the problem of expiration of a PMI possibly occurs.

If it is determined in step S201 that the communication quality is lower than the threshold, the solution proceeds to step S202. In the step S202, the user equipment generates a request signaling, to trigger the base station to configure a non-periodic beamformed reference signal related to a first beam group for the user equipment. The first beam group is determined by the base station according to channel state information periodically fed back by the user equipment. On the other hand, if it is determined in the step S201 that the communication quality is equal to or higher than the predetermined threshold, it is unnecessary to trigger the base station to configure a non-periodic beamformed reference signal for the user equipment. In the embodiment of the present disclosure, the reference signal is for example CSI-RS (Channel State Information-Reference Signal).

Generally, the base station will periodically configure a reference signal for the user equipment, and the reference signal may be non-precoded or beamformed. In response to the periodic reference signal, the user equipment will periodically feed back Channel State Information (CSI), which generally comprises CQI, PIM and RI, to the base station, such that the base station can determine a precoding codebook, denoted as W herein, according to the aforesaid PMI. The precoding codebook W generally may be represented as the product of a long-term/wideband feedback precoding codebook $W_1$ and a short-term/subband feedback precoding codebook $W_2$, that is, $W=W_1 \times W_2$. It is generally regarded that, the long-term/wideband feedback precoding codebook $W_1$ represents long-term/wideband feedback information and thus is not expired, and the short-term/subband feedback precoding codebook $W_2$ represents short-term/subband feedback information and is possibly expired in a high speed condition. The base station may determine the first beam group according to the long-term/wideband feedback precoding codebook $W_1$ (assuming that it comprises L beams). For the specific process concerning how to determine a corresponding precoding codebook according to the channel state information periodically fed back by the user equipment and determine the first beam group, reference may be made to the related description of the prior art, and description will not be repeatedly made herein.

In a certain embodiment, the request signaling generated by the user equipment may be sent to the base station through for example RRC (Radio Resource Control) signaling, via a PUSCH (Physical Uplink Shared Channel). As an exemplary implementation, the request signaling is for example represented as R1, wherein if R1=1, it is indicated that the user equipment at this time requires the base station to configure a non-periodic beamformed reference signal related to a first beam group for the user equipment.

In step S203, the base station configures a non-periodic beamformed reference signal for the user equipment, according to the received request signaling, based on the determined first beam group.

In step S204, the base station generates downlink control information to instruct the user equipment to feed back beam selection information according to the configured non-periodic beamformed reference signal. As an example, the base station for example may modify the existing DCI format 0, to utilize a redundant bit or a new added bit therein to instruct the user equipment to feed back beam selection information. For example, one-bit identification information PMI_Adjust_Flag may be set, wherein if PMI_Adjust_Flag=1, it is represented that the base station requires the user equipment to feed back beam selection information, and otherwise if PMI_Adjust_Flag=0, it is represented that the base station does not require the user equipment to feed back beam selection information.

As can be seen, by utilizing the redundant bit or the new added bit in the existing DCI format 0 to instruct the user equipment to feed back beam selection information, it is made easier to realize the compatibility with the existing communication protocol. Alternatively, it is also possible to instruct the user equipment to feed back beam selection information by modifying the existing signaling such as DCI format 1, DCI format 1A and the like.

In step S205, the user equipment generates, in response to the received downlink control information, beam selection information to be fed back to the base station.

Specifically, as an exemplary implementation manner, the user equipment may perform downlink channel quality (for example, one or more of CQI, RSRP and RSRQ) measurement based on the non-periodic beamformed reference signal configured by the base station, and then determine beam selection information based on downlink channel quality measurement results. In a certain embodiment, the beam selection information may be represented in a form of bitmap. For example, it is possible to set bits corresponding to a predetermined number (which is for example assumed to be two herein) of measurement results magnitudes of which rank first among L measurement results corresponding to the L beams in the first beam group as 1, and to set remaining bits as 0, thereby generating a bitmap X as the beam selection information.

Figure 3:
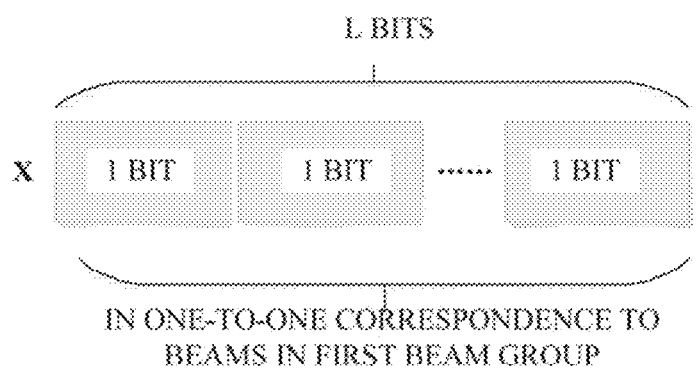
FIG. 3 is a schematic view showing an exemplary format of beam selection information according to an embodiment of the present disclosure.

FIG. 3 is a schematic view showing an exemplary format of the bitmap X as an example of beam selection information according to an embodiment of the present disclosure. As shown in FIG. 3, the bitmap X comprises a total of L bits, which are in one-to-one correspondence to the L beams in the first beam group and reflect downlink channel quality measurement results for the L beams. In this way, when receiving the bitmap X, the base station can directly determine beams corresponding to bits which are 1 therein, as candidate beams.

It can be understood that, signaling overhead can be reduced by adopting for example the form of bitmap as shown in FIG. 3 to feed back the beam selection information.

Alternatively, as another exemplary manner, the user equipment may also directly generate downlink channel quality measurement results on the L beams, in a manner of being in one-to-one correspondence to the L beams, as the beam selection information, such that the base station can determine beams corresponding to a predetermined number of downlink channel quality measurement results magnitudes of which rank first, as the candidate beams, according to the received downlink channel quality measurement results on the L beams.

In addition, as another example, instead of reporting the downlink channel quality measurement results on the L beams, the user equipment may also report the downlink channel quality measurement results magnitudes of which rank first in association with serial numbers of the beams corresponding thereto, as the beam selection information, to the base station, such that the base station can directly determine the candidate beams according to the received beam selection information.

In step S206, the base station determines one or more candidate beams and precoding codebooks corresponding to the one or more candidate beams, based on for example bits which are 1 in the bitmap X or based on the downlink channel quality measurement results fed back, according to the received beam selection information. Herein, it is assumed that the candidate beams include beam A and beam B, such that the base station can determine short-term/subband feedback precoding codebooks $W_{2A}$ and $W_{2B}$ for the beam A and the beam B, and further determine precoding codebooks $W_A$ and $W_B$ of the beam A and the beam B according to the above determined long-term/wideband feedback precoding codebook $W_1$, that is, $W_A = W_1 \times W_{2A}$, $W_B = W_1 \times W_{2B}$.

In step S207, the base station determines an effective precoding codebook according to the above determined one or more precoding codebooks (for example, the foregoing precoding codebooks $W_A$ and $W_B$) corresponding to the candidate beams. For example, the base station may determine a combination of the precoding codebooks $W_A$ and $W_B$ as the effective precoding codebook. Also for example, in a case where the beam selection information comprises downlink channel quality measurement results on related beams, the base station may also determine a codebook corresponding to a beam whose downlink channel quality measurement result (for example, RSRP value) is maximum, as the effective precoding codebook.

Preferably, in step S207, besides the one or more precoding codebooks corresponding to the candidate beams, the base station determines the effective precoding codebook based further on a precoding codebook W determined according to the PMI periodically fed back.

Specifically, as an exemplary implementation manner, the base station may determine whether differences between the precoding codebooks (for example, $W_A$ and $W_B$) corresponding to the candidate beams and the foregoing precoding codebook W determined based on the PMI fed back are less than or equal to a predetermined threshold. If it is determined that a difference between any one of the precoding codebooks $W_A$ and $W_B$ and the precoding codebook W is less than or equal to the predetermined threshold, it is indicated that the PMI fed back is not expired, and accordingly, the base station may determine the precoding codebook W as the effective precoding codebook.

On the other hand, if it is determined that differences between both the precoding codebooks $W_A$ and $W_B$ and the precoding codebook W are larger than the predetermined threshold, it is indicated that the PMI fed back is expired, making it necessary to adjust the PMI. At this time, the base station may determine a combination of the precoding codebooks $W_A$, $W_B$ and W as the effective precoding codebook. Preferably, the combination may be a linear combination.

As an example, the base station may determine, according to for example a movement speed of the user equipment, weights assigned to the precoding codebooks $W_A$, $W_B$ and W respectively when the linear combination is performed. Alternatively, in a case where the beam selection information feeds back the specific channel quality measurement results, it is also possible to determine the weights of the respective precoding codebooks according to channel quality measurement results which correspond to the precoding codebooks $W_A$ and $W_B$ respectively. Of course, it is also possible to determine the weights taking both the movement speed and the channel quality measurement results into comprehensive consideration.

Those skilled in the art may set, according to actual requirements, the weights assigned to the respective precoding codebooks when the linear combination is performed, and the present disclosure does not make specific limitations to this. For example, the weights may also be set in advance. In addition, as a simple implementation manner, for example, the weights assigned to the respective precoding codebooks may also be the same.

It should be noted that, although the example of the overall flow of the PMI adjustment solution according to the embodiment of the present disclosure has been described above with reference to FIG. 2, the exemplary flow shall not be construed to limit the scope of the present disclosure; those skilled in the art may perform modifications on the exemplary flow according to the principle of the present disclosure, and all of these modifications shall be construed to fall into the scope of the present disclosure. For example, the execution order of the foregoing respective steps is not limited to this, but instead, the respective steps may also be executed in parallel or independently. Also for example, the number of the candidate beams is also not limited to two, but may be adjusted according to actual circumstances.

Figure 4:
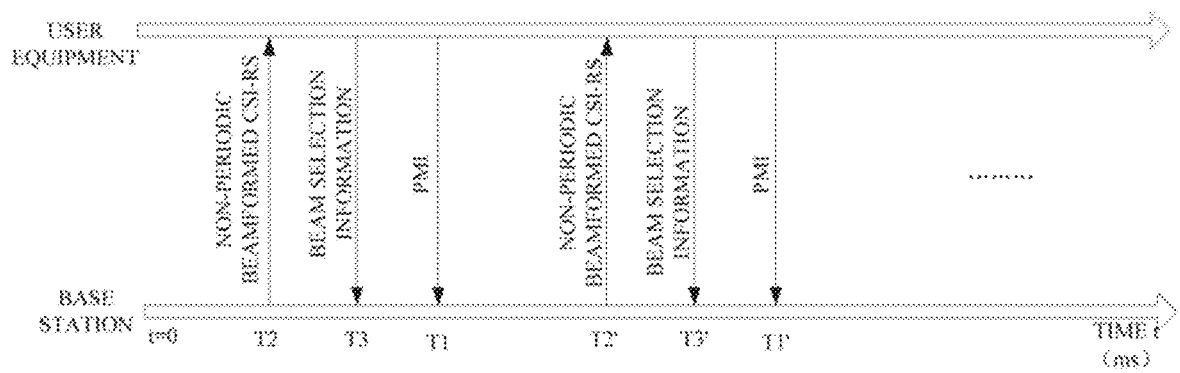
FIG. 4 is a timing sequence diagram showing a PMI adjustment solution according to an embodiment of the present disclosure.

FIG. 4 is a timing sequence diagram showing an exemplary process of a PMI adjustment solution according to an embodiment of the present disclosure.

As shown in FIG. 4, it is assumed that, a time at which the user equipment preforms a next PMI feedback is T1, the base station configures a non-periodic beamformed reference signal for the user equipment at a time T2 after receiving the request signaling from the user equipment, and the user equipment feeds back its beam selection information at a time T3 after receiving the downlink control information from the base station. The timing sequence among the times T1, T2 and T3 is: T2<T3<T1. That is, the beam selection information fed back by the user equipment according to the non-periodic beamformed reference signal may serve as a reference as to whether to adjust a PMI next fed back. Generally speaking, the user equipment may, at a next subframe after receipt of the non-periodic beamformed reference signal, report its downlink channel quality measurement result; thus, it is possible to for example set as such that T3=T2+1, a time difference between T1 and T3 shall be less than a predetermined threshold, and the predetermined threshold may be set in advance according to factors such as an actual application scenario and/or a movement speed of the user equipment and the like.

Similarly, in a next feedback period, similar operations to those performed at times T1, T2 and T3 are performed at times T1', T2' and T3', respectively; moreover, the relationship and the setting among the times T1', T2' and T3' also satisfy those described above for the times T1, T2 and T3, and description will not be repeatedly made herein.

Figure 5:
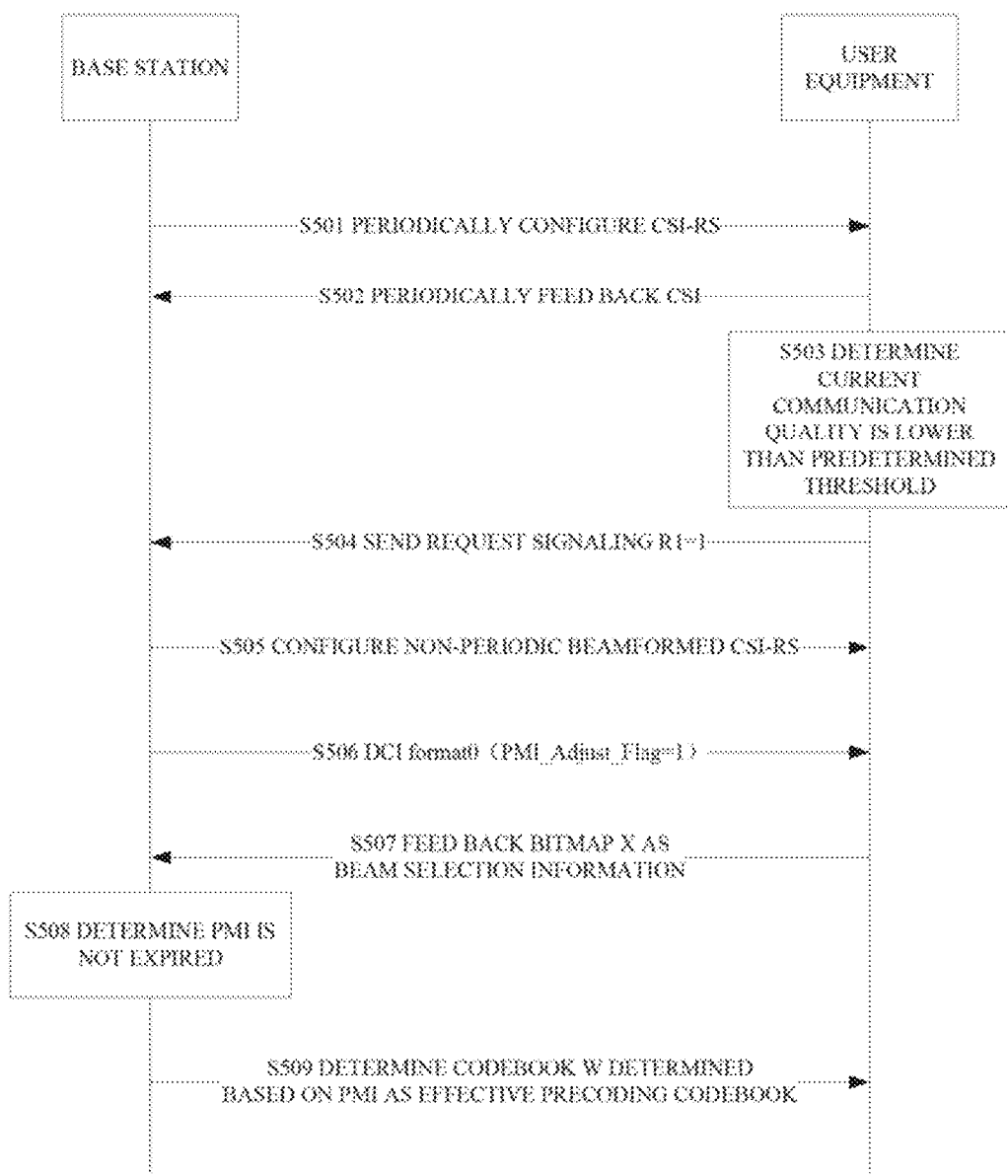
FIG. 5 is a flowchart showing an example of signaling interaction of a PMI adjustment solution according to an embodiment of the present disclosure.
Figure 6:
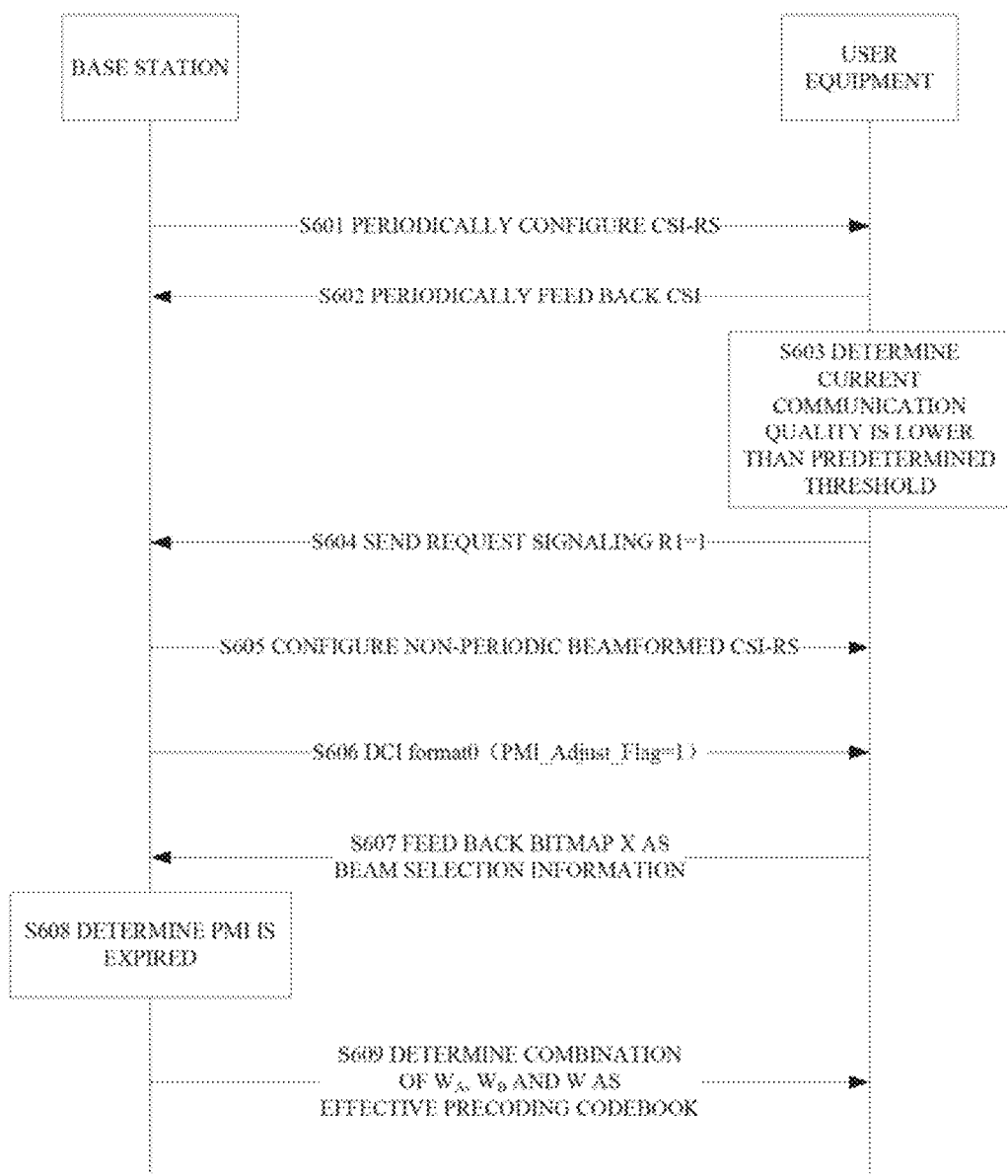
FIG. 6 is a flowchart showing another example of signaling interaction of a PMI adjustment solution according to an embodiment of the present disclosure.

To further facilitate the understanding of the PMI adjustment solution according to the embodiment of the present disclosure, further description will be made with reference to the signaling interaction flowcharts as shown in FIG. 5 and FIG. 6 below. FIG. 5 is a flowchart showing an example of a signaling interaction process of a PMI adjustment solution according to an embodiment of the present disclosure. FIG. 6 is a flowchart showing another example of a signaling interaction process of a PMI adjustment solution according to an embodiment of the present disclosure.

As shown in FIG. 5, in step S501, the base station periodically configures for example a CSI-RS for the user equipment, and in step S502, the user equipment periodically feeds back CSI. Then, in step S503, the user equipment evaluates that a current communication quality is lower than a predetermined threshold, and then in step S504, sends a request signaling to the base station, that is, R1=1, to request the base station to configure a non-periodic beamformed CSI-RS for the user equipment. Then, in step S505, the base station configures a non-periodic beamformed CSI-RS for the user equipment based on the first beam group determined according to the long-term/wideband feedback precoding codebook $W_1$, and then in step S506, sends downlink control information DCI format 0 (wherein, PMI_Adjust_Flag=1) to the user equipment to instruct the user equipment to feed back beam selection information. In step S507, the user equipment feeds back beam selection information for example in the form of a bitmap X. In step S508, the base station determines, for example by comparing the precoding codebooks $W_A$ and $W_B$ corresponding to the candidate beams with the precoding codebook W determined according to the PMI periodically fed back, that the PMI fed back is not expired, and thereby sends the precoding codebook W to the user equipment as the effective precoding codebook in step S509.

It should be noted that, the execution order of the respective steps in the flowchart as shown in FIG. 5 is not limited to that described above, and the execution order as shown aims only to facilitate description. Actually, the steps S501 and S502 of periodically configuring a CSI-RS and feeding back CSI are executed independently of but have no chronological relationship with the subsequent steps S503 and S509 of selectively adjusting a PMI. The solution (i.e., the steps S503 through S509) of selectively adjusting a PMI according to the present disclosure is triggered based on an event, for example, is triggered when a communication quality of the user equipment drops and thereby fails to satisfy a predetermined requirement.

In addition, it should also be noted that, the signaling interaction flowchart as shown in FIG. 5 is only an example given to facilitate description and understanding, but is not intended to limit the scope of the present disclosure. For example, after receiving the beam selection information, the base station may also not execute the foregoing step S508, but determines the candidate beams and the corresponding precoding codebooks directly according to the beam selection information in step S509, and determines the effective precoding codebook according to the precoding codebooks corresponding to the candidate beams and sends the effective precoding codebook to the user equipment. Also for example, the feedback manner for the beam selection information is not necessarily the bitmap X, but may be the foregoing specific channel quality measurement results. Those skilled in the art may perform proper modifications on the signaling interaction flow according to the principle of the present disclosure, and all of such modifications shall be construed to fall into the scope of the present disclosure.

The signaling interaction flow as shown in FIG. 6 is substantially the same as the signaling interaction process as shown in FIG. 5 except for a difference in the following: in step S608, the base station determines that a PMI is expired, and thereby in step S609, sends a combination (preferably, a linear combination) of the precoding codebooks $W_A$, $W_B$ and W as the effective precoding codebook to the user equipment. Similarly, it may be understood that, the determination operation in the step S608 may also not be executed, but instead, the effective precoding codebook is determined directly based on a combination of $W_A$ and $W_B$ or a combination of $W_A$, $W_B$ and W.

Alternatively, as another embodiment, instead of adjusting the PMI periodically fed back based on the beam selection information fed back by the user equipment as described above, the user equipment may also feed back a non-periodic PMI according to the configured non-periodic beamformed reference signal, such that the base station can directly determine the effective precoding codebook based on the non-periodic PMI. The PMI adjustment solution according to the embodiment will be described in detail with reference to FIG. 7.

Figure 7:
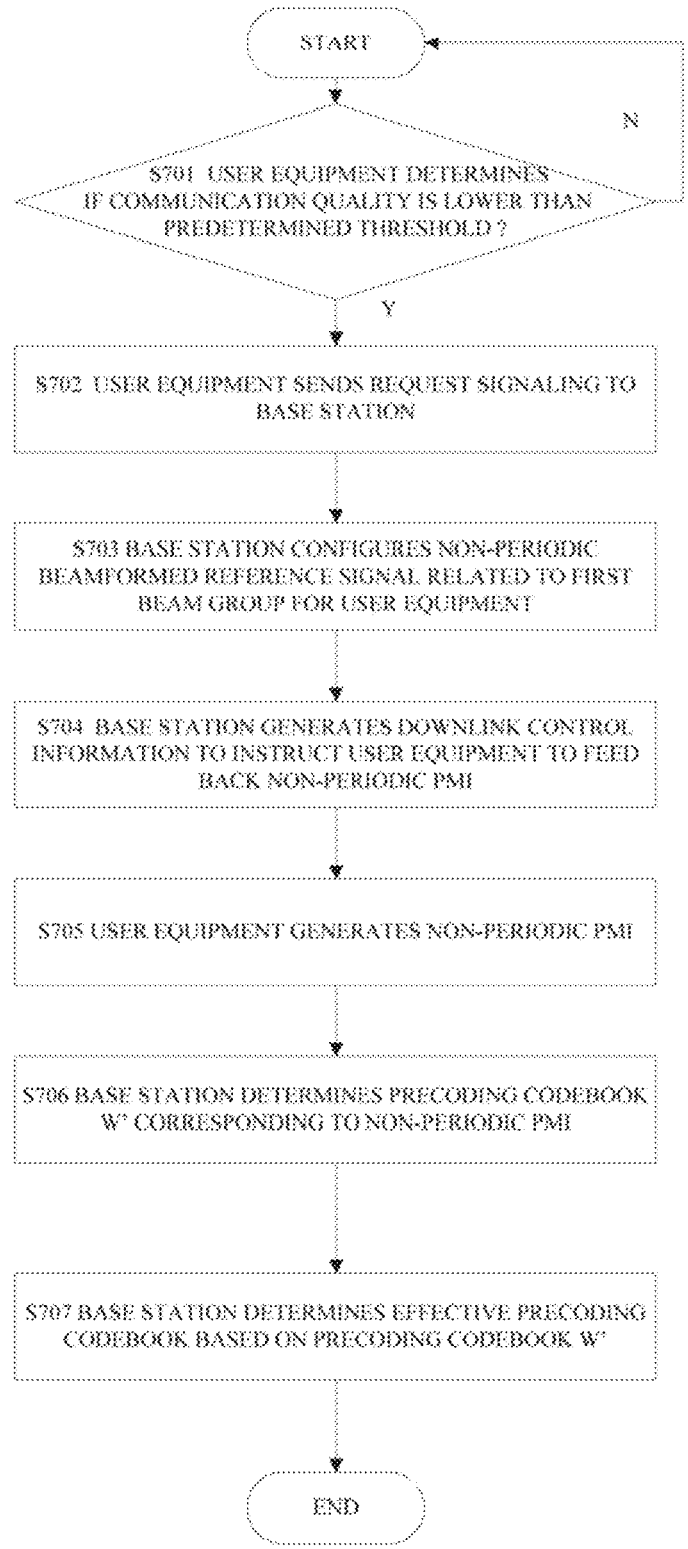
FIG. 7 is an overall flowchart showing an exemplary process of a PMI adjustment solution according to another embodiment of the present disclosure.

FIG. 7 is an overall flowchart showing an exemplary process of a PMI adjustment solution according to another embodiment of the present disclosure.

The processing in the steps S701 through S703 as shown in FIG. 7 are the same as the processing in the steps S201 through S203 as shown in FIG. 2, and will not be repeated herein.

Next, in step S704, the base station generates downlink control information to instruct the user equipment to feed back a non-periodic PMI. Specifically, similarly to the step S204, the base station may also modify the existing DCI format 0, to utilize a redundant bit or a new added bit therein to instruct the user equipment to feed back a non-periodic PMI. For example, one-bit identification information PMI_Adjust_Flag may be set, wherein if PMI_Adjust_Flag=1, it is represented that the base station requires the user equipment to feed back a non-periodic PMI, and otherwise if PMI_Adjust_Flag=0, it is represented that the base station does not require the user equipment to feed back a non-periodic PMI. Alternatively, as another exemplary implementation manner, it is also possible to modify the existing RRC signaling, to trigger the user equipment to feed back non-periodic CSI (including PMI, CQI and RI) based on a non-periodic reference signal (CSI-RS) from the base station.

Then, the solution proceeds to step S705. In the step S705, the user equipment generates a non-periodic PMI based on the configured non-periodic beamformed reference signal and feeds back the generated PMI to the base station.

Next, in step S706, the base station may determine a corresponding precoding codebook W' according to the received non-periodic PMI, and then in step S707, determine an effective precoding codebook based on the precoding codebook W'. As an exemplary manner, the base station may directly determine the precoding codebook W' as the effective precoding codebook. Alternatively, the base station may also determine a combination of the precoding codebook W' and the precoding codebook W determined according to the PMI periodically fed back, as the effective precoding codebook. The combination for example may be a linear combination.

The embodiment mainly describes the difference from the foregoing PMI adjustment solution based on beam selection information. For other similar contents, reference may be made to the foregoing corresponding description, and description will not be repeatedly made herein.

It should be noted that, although the two embodiments of performing PMI adjustment based on the beam selection information fed back by the user equipment and performing PMI adjustment based on the non-periodic PMI fed back by the user equipment have been separately described above, in actual implementation those skilled in the art may also combine the foregoing two embodiments according to the principle of the present disclosure. For example, when generating downlink control information to instruct the user equipment to feed back information, the base station may make an instruction by utilizing a two-bit redundant bit or new added bit in the existing DCI format 0. For example, as an exemplary manner, two-bit identification information PMI_Adjust_Flag may be set, wherein if PMI_Adjust_Flag=00, it is represented that the user equipment is not required to perform a feedback; if PMI_Adjust_Flag=10, it is represented that the user equipment is required to feed back beam selection information; and if PMI_Adjust_Flag=11, it is represented that the user equipment is required to feed back a non-periodic PMI. In this way, the user equipment may perform proper information feedback according to the received downlink control information, such that the base station can adopt a proper PMI adjustment solution according to the received feedback information.

According to the foregoing embodiment of the present disclosure, besides periodically configuring a reference signal like in the prior art, the base station is also selectively triggered, according to a communication quality of the user equipment, to configure a non-periodic beamformed reference signal for the user equipment so as to determine, according to the beam selection information or the non-periodic PMI fed back by the user equipment based on the non-periodic beamformed reference signal, whether it is necessary to perform adjustment on the PMI periodically fed back, thereby avoiding the problems of precoding mismatching and communication quality deterioration of the user equipment which are caused by an expired PMI in a high speed scenario.

In correspondence to the PMI adjustment solutions according to the embodiments of the present disclosure as described above, configurations at base station end and user equipment end in a wireless communication system according to embodiments of the present disclosure will be described with FIG. 8 through 10 below.

Figure 8:
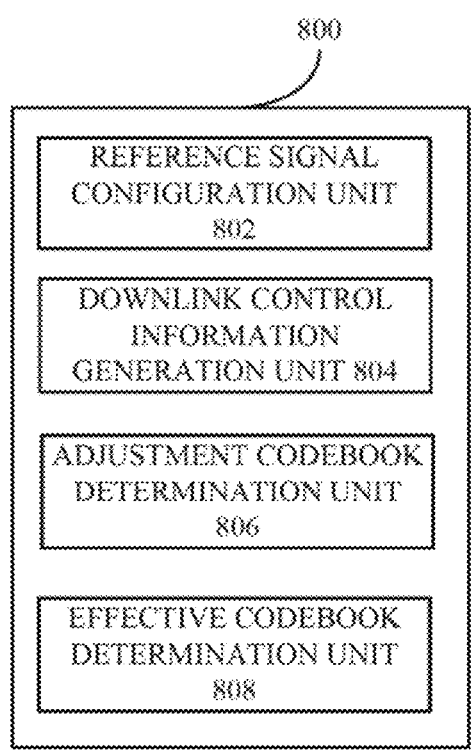
FIG. 8 is a block diagram showing a function configuration example of an electronic device at base station end in a wireless communication system according to an embodiment of the present disclosure.

FIG. 8 is a block diagram showing a function configuration example of an electronic device at base station end in a wireless communication system according to an embodiment of the present disclosure.

As shown in FIG. 8, an electronic device 800 according to the embodiment may comprise a reference signal configuration unit 802, a downlink control information generation unit 804, an adjustment codebook determination unit 806 and an effective codebook determination unit 808.

It should be noted that, each unit described herein is only a logic function module divided according to the specific function implemented by the unit, but is not used to limit a specific implementation manner. In actual implementation, said each function unit may be realized as an independent physical entity, or may also be realized by a single entity (e.g., a processor (a CPU or a DSP or the like), an integrated circuit, etc.).

The reference signal configuration unit 802 may be configured to configure, in response to a request signaling from a user equipment, a non-periodic beamformed reference signal related to a first beam group for the user equipment. The first beam group is determined by the base station according to channel state information periodically fed back by the user equipment.

Preferably, the reference signal configuration unit 802 may be further configured to configure a periodic reference signal for the user equipment, and to determine the first beam group according to the channel state information fed back by the user equipment in response to the periodic reference signal. The periodic reference signal may be non-precoded or beamformed.

Specifically, as described above, the reference signal configuration unit 802 determines a long-term/wideband feedback precoding codebook $W_1$ based on the PMI in the CSI periodically fed back by the user equipment, and determines the first beam group based on the long-term/wideband feedback precoding codebook $W_1$, thereby configuring a non-periodic beamformed reference signal for the user equipment based on the first beam group. The foregoing reference signal comprises for example CSI-RS.

The downlink control information generation unit 804 may be configured to generate downlink control information to instruct the user equipment to feed back beam selection information according to the non-periodic beamformed reference signal.

Preferably, the control information generation unit 804 may modify the existing DCI format 0, to utilize a redundant bit or a new added bit therein as PMI_Adjust_Flag to instruct the user equipment to feed back beam selection information.

The adjustment codebook determination unit 806 may be configured to determine one or more candidate beams and one or more precoding codebooks corresponding to the one or more candidate beams according to the beam selection information fed back by the user equipment.

Specifically, the adjustment codebook determination unit 806 may determine the one or more candidate beams according to bit information indicating a downlink channel quality measurement result based on the non-periodic beamformed reference signal in the beam selection information in a form of bitmap. For example, beams corresponding to bits which are 1 in the bitmap X may be determined as the one or more candidate beams. Alternatively, the adjustment codebook determination unit 806 may also determine beams corresponding to a predetermined number of downlink channel quality measurement results magnitudes of which rank first, as the one or more candidate beams, according to the downlink channel quality measurement result based on the non-periodic beamformed reference signal which is fed back by the user equipment. Then, the adjustment codebook determination unit 806 may determine one or more second precoding codebooks corresponding to the one or more candidate beams, for example, the foregoing precoding codebooks $W_A$ and $W_B$. For the specific process of determining the second precoding codebooks, reference may be made to the foregoing description, and description will not be repeatedly made herein.

The effective codebook determination unit 808 may be configured to determine an effective precoding codebook based on the determined one or more second precoding codebooks (for example, the foregoing precoding codebooks $W_A$ and $W_B$). For example, the effective codebook determination unit 808 may determine a combination of $W_A$ and $W_B$ as the effective precoding codebook. Alternatively, the effective codebook determination unit 808 may determine one of $W_A$ and $W_B$ as the effective precoding codebook according to the channel quality measurement result.

Preferably, besides the one or more second precoding codebooks corresponding to the candidate beams, the effective codebook determination unit 808 determines the effective precoding codebook based further on a first precoding codebook (for example, the foregoing precoding codebook W) which is determined according to the channel state information periodically fed back.

Specifically, as an exemplary implementation, the effective codebook determination unit 808 may be configured to determine, if a difference between any one of the one or more second precoding codebooks and the first precoding codebook is less than or equal to a predetermined threshold, the first precoding codebook as the effective precoding codebook $W_E$, that is, $W_E$=W. On the other hand, the effective codebook determination unit 808 may determine, if the difference between each of the one or more second precoding codebooks and the first precoding codebook is larger than the predetermined threshold, a combination (preferably, a linear combination) of the first precoding codebook and the one or more second precoding codebooks as the effective precoding codebook, for example, $W_E$=aW+$bW_A$+$cW_B$. The weight values a, b and c may be determined in advance, or may also be determined by the effective codebook determination unit 808 according to a movement speed of the user equipment and/or beam selection information (specifically, an amplitude of the downlink channel quality measurement result based on the non-periodic beamformed reference signal which is fed back by the user equipment).

Figure 9:
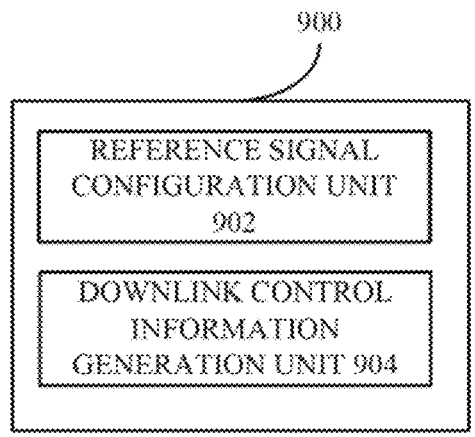
FIG. 9 is a block diagram showing a function configuration example of an electronic device at base station end in a wireless communication system according to another embodiment of the present disclosure.

FIG. 9 is a block diagram showing a function configuration example of an electronic device at base station end in a wireless communication system according to another embodiment of the present disclosure.

As shown in FIG. 9, an electronic device 900 according to the embodiment may comprise a reference signal configuration unit 902 and a downlink control information generation unit 904.

It should be noted that, each unit described herein is only a logic function module divided according to the specific function implemented by the unit, but is not used to limit a specific implementation manner. In actual implementation, said each function unit may be realized as an independent physical entity, or may also be realized by a single entity (e.g., a processor (a CPU or a DSP or the like), an integrated circuit, etc.).

The reference signal configuration unit 902 may be configured to configure, in response to a request signaling from a user equipment, a non-periodic beamformed reference signal related to a first beam group for the user equipment, the first beam group being determined by the base station according to channel state information periodically fed back by the user equipment.

The downlink control information generation unit 904 may be configured to generate downlink control information to instruct the user equipment to feed back a non-periodic PMI according to the non-periodic beamformed reference signal.

Preferably, the electronic device 900 may further comprise a codebook determination unit, which may be configured to determine a corresponding second precoding codebook according to the received non-periodic PMI, and to further determine an effective precoding codebook based on the second precoding codebook. For example, the codebook determination unit may directly determine the second precoding codebook as the effective precoding codebook.

Preferably, besides the second precoding codebook, the codebook determination unit determines the effective precoding codebook based further on a first precoding codebook which is determined according to the PMI periodically fed back. For example, a combination (for example, a linear combination) of the second precoding codebook and the first precoding codebook may be determined as the effective precoding codebook.

It should be noted that the foregoing electronic devices 800 and 900 may be realized in chip level or may also be realized in device level by including other external components. For example, the electronic devices 800 and 900 each may as a whole operate as a base station, which may include a communication interface for performing transceiving operations, for example, receiving a request signaling from the user equipment, sending a non-periodic beamformed reference signal and downlink control information to the user equipment, receiving beam selection information or a non-periodic PMI from the user equipment, and sending a determined effective precoding codebook to the user equipment, and the like.

Figure 10:
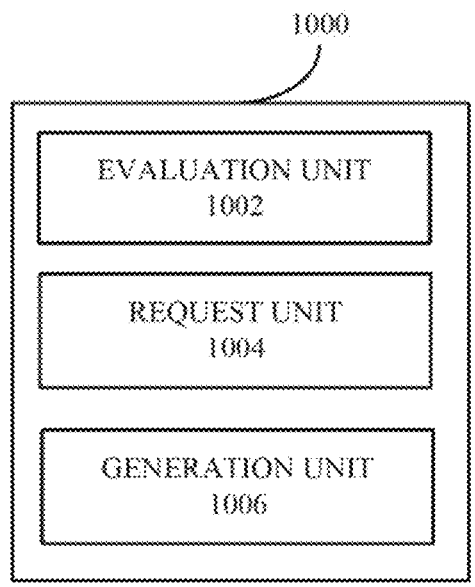
FIG. 10 is a block diagram showing a function configuration example of an electronic device at user equipment end in a wireless communication system according to an embodiment of the present disclosure.

FIG. 10 is a block diagram showing a function configuration example of an electronic device at user equipment end in a wireless communication system according to an embodiment of the present disclosure.

As shown in FIG. 10, an electronic device 1000 according to the present embodiment may comprise an evaluation unit 1002, a request unit 1004 and a generation unit 1006.

It should be noted that, each unit described herein is only a logic function module divided according to the specific function implemented by the unit, but is not used to limit a specific implementation manner. In actual implementation, said each function unit may be realized as an independent physical entity, or may also be realized by a single entity (e.g., a processor (a CPU or a DSP or the like), an integrated circuit, etc.).

The evaluation unit 1002 may be configured to evaluate a communication quality between the user equipment and a base station, to determine whether the communication quality is lower than a predetermined threshold. The operation for example may be periodically performed.

The request unit 1004 may be configured to generate, in a case where the evaluation unit 1002 determines that the communication quality is lower than the predetermined threshold, a request signaling to request the base station to configure a non-periodic beamformed reference signal related to a first beam group for the user equipment. The first beam group is determined by the base station according to channel state information periodically fed back by the user equipment. For the specific determination process, reference may be made to the foregoing description, and description will not be repeatedly made herein.

The generation unit 1006 may be configured to generate, in response to downlink control information from the base station, beam selection information according to the non-periodic beamformed reference signal, for the base station to determine an effective precoding codebook based on the beam selection information.

Specifically, the information generation unit 1006 may be configured to generate the beam selection information in a form of bitmap, according to a downlink channel quality measurement result based on the non-periodic beamformed reference signal, in response to a redundant bit or a new added bit (PMI_Adjust_Flag=1) in the DCI format 0. For example, bits corresponding to a predetermined number of downlink channel quality measurement results magnitudes of which rank first among the measurement results are set as 1, and remaining bits are set as 0, thereby generating the foregoing bitmap X as the beam selection information. Alternatively, the information generation unit 1006 may also directly generate a downlink channel quality measurement result based on the non-periodic beamformed reference signal, as the beam selection information. The beam selection information is in one-to-one correspondence to the beams in the first beam group.

Preferably, the information generation unit 1006 may be further configured to generate, in response to a periodic reference signal (either precoded or beamformed) from the base station, the channel state information to be periodically fed back.

Figure 11:
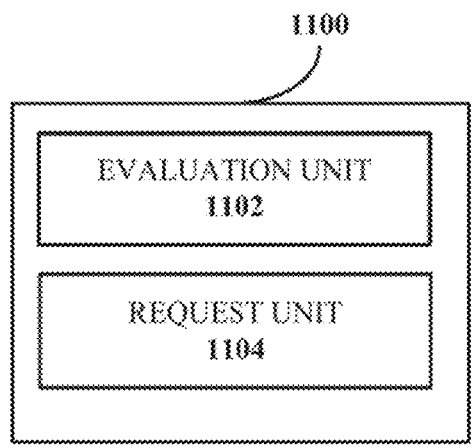
FIG. 11 is a block diagram showing a function configuration example of an electronic device at user equipment end in a wireless communication system according to another embodiment of the present disclosure.

FIG. 11 is a block diagram showing a function configuration example of an electronic device at user equipment end in a wireless communication system according to another embodiment of the present disclosure.

As shown in FIG. 11, an electronic device 1100 according to the embodiment may comprise an evaluation unit 1102 and a request unit 1104.

It should be noted that, each unit described herein is only a logic function module divided according to the specific function implemented by the unit, but is not used to limit a specific implementation manner. In actual implementation, said each function unit may be realized as an independent physical entity, or may also be realized by a single entity (e.g., a processor (a CPU or a DSP or the like), an integrated circuit, etc.).

The function configuration examples of the evaluation unit 1102 and the request unit 1104 herein are the same as the function configuration examples of the evaluation unit 1002 and the request unit 1004 as described above with reference to FIG. 10, and will not be repeatedly described herein.

Preferably, the electronic device 1100 may further comprise a generation unit, which may be configured to generate, in response to downlink control information from the base station, a non-periodic Precoding Matrix Indicator to be sent to the base station according to the non-periodic beamformed reference signal, for the base station to determine an effective precoding codebook based on the non-periodic Precoding Matrix Indicator.

It should be understood that the foregoing electronic devices 1000 and 1100 may be realized in chip level or may also be realized in device level by including other external components. For example, the electronic devices 1000 and 1100 each may as a whole operate as a user equipment, which may include a communication interface for performing transceiving operations, for example, sending a request signaling to the base station, receiving a periodic reference signal and a non-periodic beamformed reference signal and downlink control information from the base station, sending channel state information and beam selection information or a non-periodic PMI to the base station, and receiving an effective precoding codebook from the base station, and the like.

It should be noted that, the configurations of the electronic devices 800 and 900 at base station end and the electronic devices 1000 and 1100 at user equipment end as described herein correspond to the PMI adjustment solutions as described above with reference to FIG. 2 through FIG. 7. Thus, for contents not described in detail herein, reference may be made to the foregoing corresponding description, and no repeated description will be made herein.

In addition, it should also be noted that, although the function configurations of the electronic devices 800 through 1100 have been described above with reference to FIG. 8 through FIG. 11, this is only exemplary but not limiting, and those skilled in the art may carry out modifications on the above function configurations, for example carry out deletions, combinations, sub-combinations and alternations and the like on the above function modules, according to the principle of the present disclosure and actual circumstances. Moreover, all of such modifications shall be construed to fall within the scope of the present disclosure.

Figure 12:
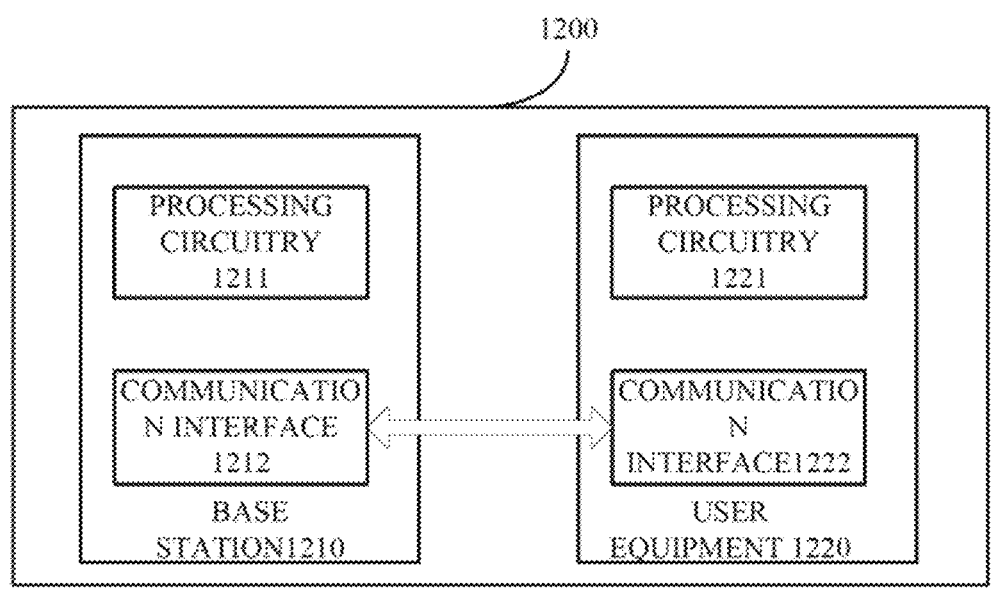
FIG. 12 is a block diagram showing a configuration example of a wireless communication system according to an embodiment of the present disclosure.

FIG. 12 is a block diagram showing a configuration example of a wireless communication system according to an embodiment of the present disclosure.

As shown in FIG. 12, a wireless communication system 1200 according to the embodiment may comprise a base station 1210 and a user equipment 1220.

The base station 1210 may comprise a processing circuitry 1211 and a communication interface 1212.

The processing circuitry 1211 may be configured to implement the functions of the respective units of the electronic devices 800 and 900 at base station end as described above with reference to FIG. 8 and FIG. 9. The specific implementation manner of the processing circuitry 1211 may include a CPU, a DSP, a dedicated integrated circuit and the like.

The communication interface 1212 may be configured to perform transceiving operations between the base station and the user equipment.

The user equipment 1220 may comprise a processing circuitry 1221 and a communication interface 1222.

The processing circuitry 1221 may be configured to implement the functions of the respective units of the electronic devices 1000 and 1100 at user equipment end as described above with reference to FIG. 10 and FIG. 11. The specific implementation manner of the processing circuitry 1221 may include a CPU, a DSP, a dedicated integrated circuit and the like.

The communication interface 1222 may be configured to perform transceiving operations between the user equipment and the base station.

In correspondence to the foregoing device embodiments, the present disclosure further provides the following method embodiments.

Figure 13:
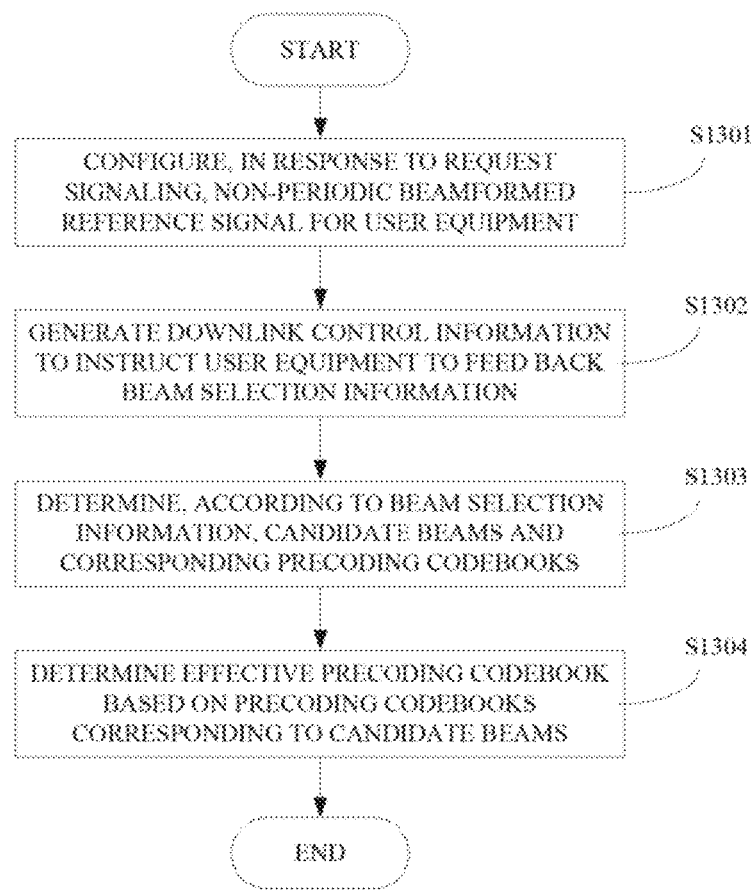
FIG. 13 is a flowchart showing a process example of a method at base station end in a wireless communication system according to an embodiment of the present disclosure.

FIG. 13 is a flowchart showing a process example of a method at base station end in a wireless communication system according to an embodiment of the present disclosure.

As shown in FIG. 13, a method 1300 according to the embodiment starts from step S1301. In the step S1301, a non-periodic beamformed reference signal related to a first beam group is configured for the user equipment in response to a request signaling from a user equipment, the first beam group being determined by the base station according to channel state information periodically fed back by the user equipment Then, the method proceeds to step S1302. In the step S1302, downlink control information is generated to instruct the user equipment to feed back beam selection information according to the non-periodic beamformed reference signal.

Next, the method proceeds to step S1303. In the step S1303, one or more candidate beams and one or more second precoding codebooks corresponding to the one or more candidate beams are determined according to the beam selection information.

Finally, in step S1304, an effective precoding codebook is determined based on the one or more second precoding codebooks.

Preferably, in the step S1304, the effective precoding codebook is determined based further on a first precoding codebook which is determined according to the channel state information periodically fed back.

Figure 14:
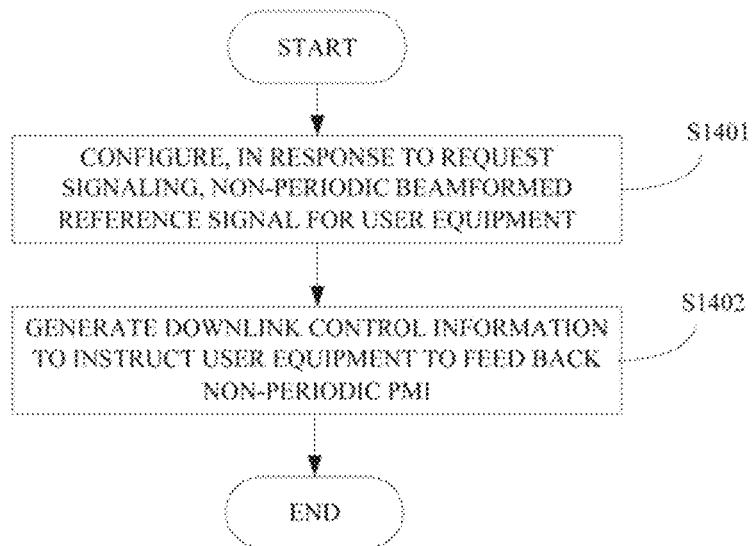
FIG. 14 is a flowchart showing a process example of a method at base station end in a wireless communication system according to another embodiment of the present disclosure.

FIG. 14 is a flowchart showing a process example of a method at base station end in a wireless communication system according to another embodiment of the present disclosure.

As shown in FIG. 14, a method 1400 according to the embodiment starts from step S1401. In the step S1401, a non-periodic beamformed reference signal related to a first beam group is configured for the user equipment in response to a request signaling from a user equipment, the first beam group being determined by the base station according to channel state information periodically fed back by the user equipment.

Then, the method proceeds to step S1402. In the step S1402, downlink control information is generated to instruct the user equipment to feed back a non-periodic PMI according to the non-periodic beamformed reference signal.

Preferably, the method may further comprise the step of: determining a second precoding codebook according to the non-periodic PMI, and further determining an effective precoding codebook according to the second precoding codebook. Preferably, the effective precoding codebook may also be determined based on a combination of the second precoding codebook and a first precoding codebook which is determined according to the PMI periodically fed back.

It should be noted that, the method embodiments as shown in FIGS. 13 and 14 correspond to the embodiments of the electronic devices at base station end as described above with reference to FIG. 8 and FIG. 9. Thus, for contents not described in detail herein, reference may be made to the foregoing corresponding description, and no repeated description will be made herein.

Figure 15:
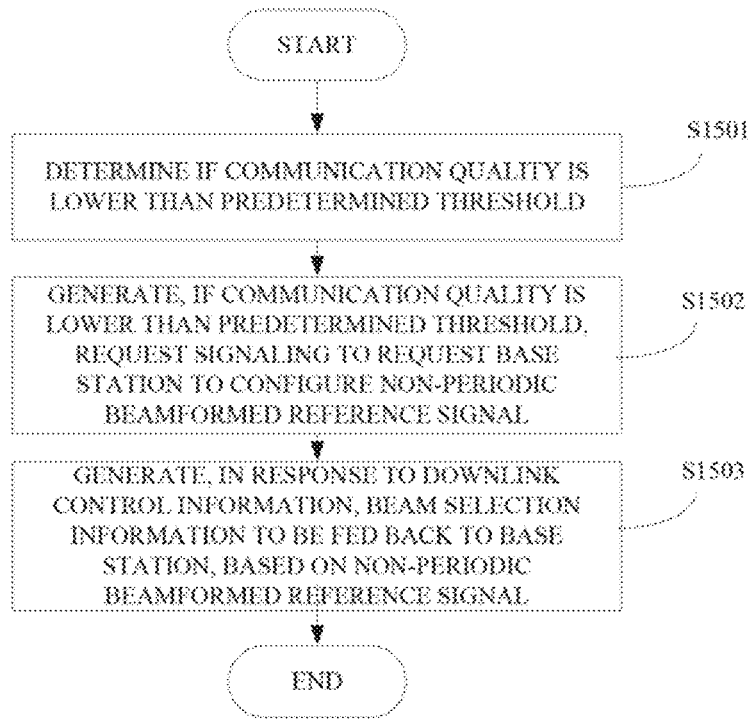
FIG. 15 is a flowchart showing a process example of a method at user equipment end in a wireless communication system according to an embodiment of the present disclosure.

FIG. 15 is a flowchart showing a process example of a method at user equipment end in a wireless communication system according to an embodiment of the present disclosure.

As shown in FIG. 15, the method starts from step S1501. In the step S1501, it is determined whether a communication quality between the user equipment and a base station is lower than a predetermined threshold.

Then, the method proceeds to step S1502. In the step S1502, in a case where it is determined that the communication quality is lower than the predetermined threshold, a request signaling to be sent to the base station is generated, to request the base station to configure a non-periodic beamformed reference signal related to a first beam group for the user equipment, the first beam group being determined by the base station according to channel state information periodically fed back by the user equipment.

Next, the method proceeds to step S1503. In the step S1503, beam selection information to be sent to the base station is generated according to the non-periodic beamformed reference signal in response to downlink control information from the base station, for the base station to determine an effective precoding codebook based on the beam selection information.

Figure 16:
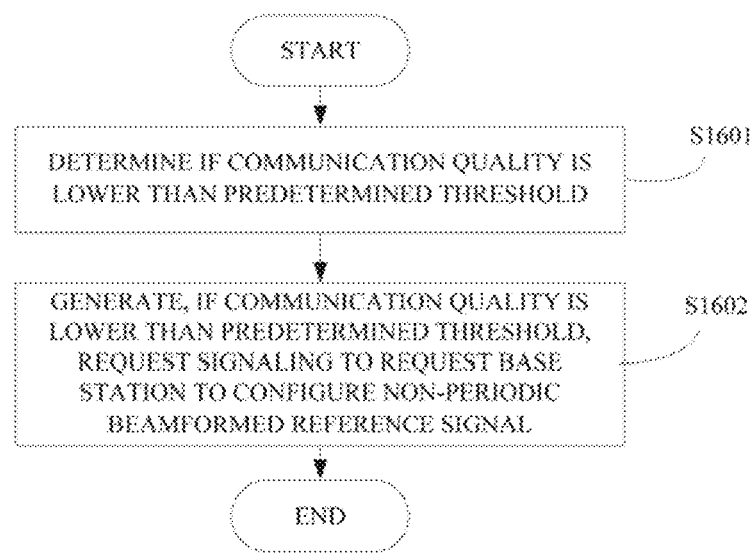
FIG. 16 is a flowchart showing a process example of a method at user equipment end in a wireless communication system according to another embodiment of the present disclosure.

FIG. 16 is a flowchart showing a process example of a method at user equipment end in a wireless communication system according to another embodiment of the present disclosure.

As shown in FIG. 16, the method starts from step S1601. In the step S1601, it is determined whether a communication quality between the user equipment and a base station is lower than a predetermined threshold.

Then, the method proceeds to step S1602. In the step S1602, in a case where it is determined that the communication quality is lower than the predetermined threshold, a request signaling to be sent to the base station is generated, to request the base station to configure a non-periodic beamformed reference signal related to a first beam group for the user equipment, the first beam group being determined by the base station according to channel state information periodically fed back by the user equipment.

Preferably, the method may further comprise the step of: generating, in response to downlink control information from the base station, a non-periodic PMI to be sent to the base station according to the non-periodic beamformed reference signal, for the base station to determine an effective precoding codebook based on the non-periodic PMI.

It should be noted that, the method embodiments as shown in FIGS. 15 and 16 correspond to the embodiments of the electronic devices at user equipment end as described above with reference to FIG. 10 and FIG. 11. Thus, for contents not described in detail herein, reference may be made to the foregoing corresponding description, and no repeated description will be made herein.

It should be understood that, the machine executable instructions in the storage medium and the program product according to the embodiments of the present disclosure may be further configured to implement the methods corresponding to the foregoing device embodiments. Thus for contents not described in detail herein, reference may be made to the foregoing corresponding description, and no repeated description will be made herein.

Accordingly, a storage medium for carrying the above program product comprising machine executable instructions is also included in the disclosure of the present invention. The storage medium includes but is not limited to a floppy disc, an optical disc, a magnetic optical disc, a memory card, a memory stick and the like.

Figure 17:
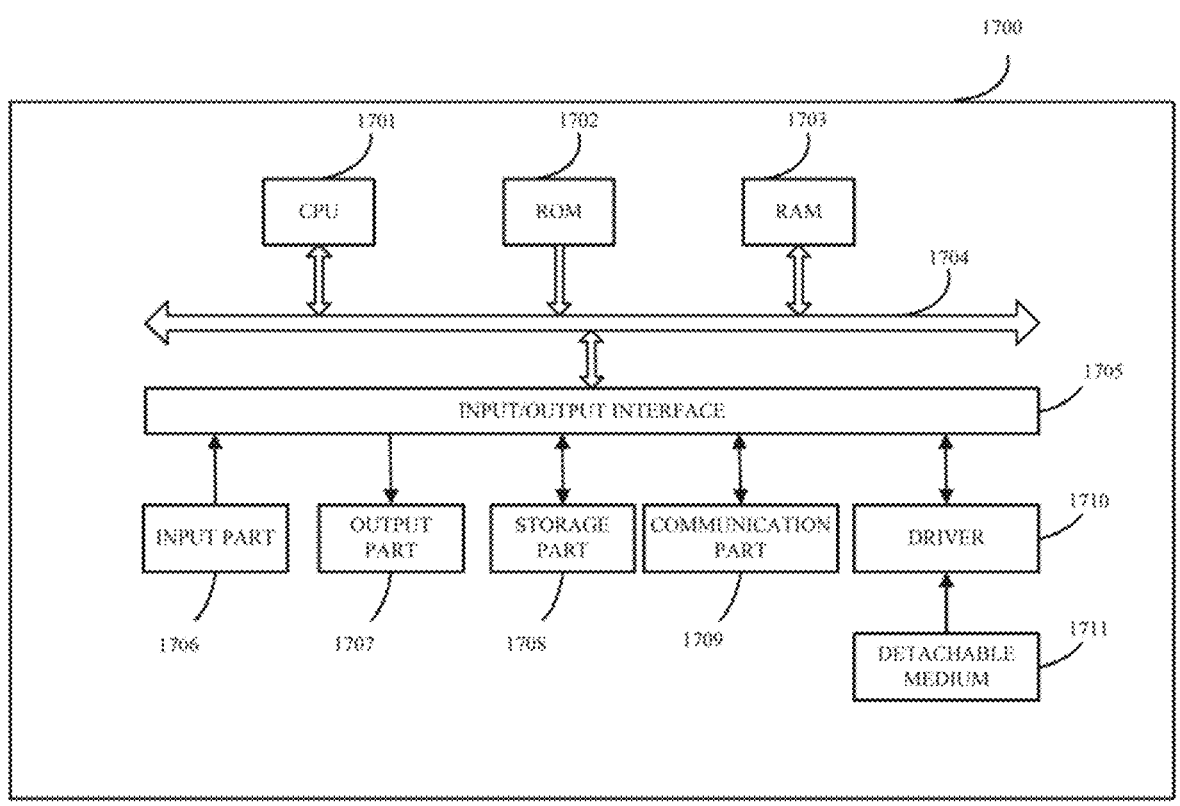
FIG. 17 is a block diagram showing an exemplary structure of a personal computer used as an information processing apparatus usable in an embodiment of the present disclosure.

In addition, it should also be noted that, the foregoing series of processing and devices may also be implemented by software and/or firmware. In the case of implementation by software and/or firmware, programs constituting the software are installed from a storage medium or a network to a computer having a dedicated hardware structure, for example the universal personal computer 1700 as shown in FIG. 17. The computer, when installed with various programs, can execute various functions and the like. FIG. 17 is a block diagram showing an exemplary structure of a personal computer as an information processing device usable in an embodiment of the disclosure.

In FIG. 17, a Central Processing Unit (CPU) 1701 executes various processing according to programs stored in a Read-Only Memory (ROM) 1702 or programs loaded from a storage part 1708 to a Random Access Memory (RAM) 1703. In the RAM 1703, data needed when the CPU 1701 executes various processing and the like is also stored according to requirements.

The CPU 1701, the ROM 1702 and the RAM 1703 are connected to each other via a bus 1704. An input/output interface 1705 is also connected to the bus 1704.

The following components are connected to the input/output interface 1705: an input part 1706, including a keyboard, a mouse and the like; an output part 1707, including a display, such as a Cathode Ray Tube (CRT), a Liquid Crystal Display (LCD) and the like, as well as a speaker and the like; the storage part 1708, including a hard disc and the like; and a communication part 1709, including a network interface card such as an LAN card, a modem and the like. The communication part 1709 executes communication processing via a network such as the Internet.

According to requirements, a driver 1710 is also connected to the input/output interface 1705. A detachable medium 1711 such as a magnetic disc, an optical disc, a magnetic optical disc, a semiconductor memory and the like is installed on the driver 1710 according to requirements, such that computer programs read therefrom are installed in the storage part 1708 according to requirements.

In a case where the foregoing series of processing is implemented by software, programs constituting the software are installed from a network such as the Internet or a storage medium such as the detachable medium 1711.

Those skilled in the art should appreciate that, such a storage medium is not limited to the detachable medium 1711 in which programs are stored and which are distributed separately from an apparatus to provide the programs to users as shown in FIG. 17. Examples of the detachable medium 1711 include a magnetic disc (including a floppy disc (registered trademark)), a compact disc (including a Compact Disc Read-Only Memory (CD-ROM) and a Digital Versatile Disc (DVD), a magneto optical disc (including a Mini Disc (MD) (registered trademark)), and a semiconductor memory. Or, the memory medium may be hard discs included in the ROM 1702 and the memory part 1708, in which programs are stored and which are distributed together with the apparatus containing them to users.

Application Examples

The technology of the present disclosure can be applied to various products, including a base station and a user equipment. Specifically, the base station may be realized as any type of evolutional node B (eNB), such as macro eNB and small eNB. The small eNB may be an eNB of a cell with smaller coverage than a macro cell, such as a pico eNB, a micro eNB and a home (femto) eNB. Alternatively, the base station may be realized as any other type of base station, such as NodeB and Base Transceiver Station (BTS). The base station may comprise: a main body (also called base station equipment) configured to control wireless communication; and one or more Remote Radio Heads (RRHs) arranged at a different place from the main body. In addition, all the various types of terminals which will be described below can operate as base stations by temporarily or semi-persistently executing base station functions.

The user equipment may be realized as a mobile terminal (such as an intelligent telephone, a tablet Personal Computer (PC), a notebook PC, a portable game terminal, a portable/softdog mobile router and a digital image pick-up device) or an in-vehicle terminal (such as an automobile navigation device). The user equipment may also be realized as a terminal for executing Machine-to-Machine (M2M) communication (also called a Machine Type Communication (MTC) terminal). In addition, the user equipment may be a wireless communication module (such as an integrated circuit module including a single wafer) installed on each of the above terminals.

Hereinafter, application examples according to the present disclosure will be described with reference to FIG. 18 through FIG. 21 below.

Application Examples Regarding Base Station

First Application Example

Figure 18:
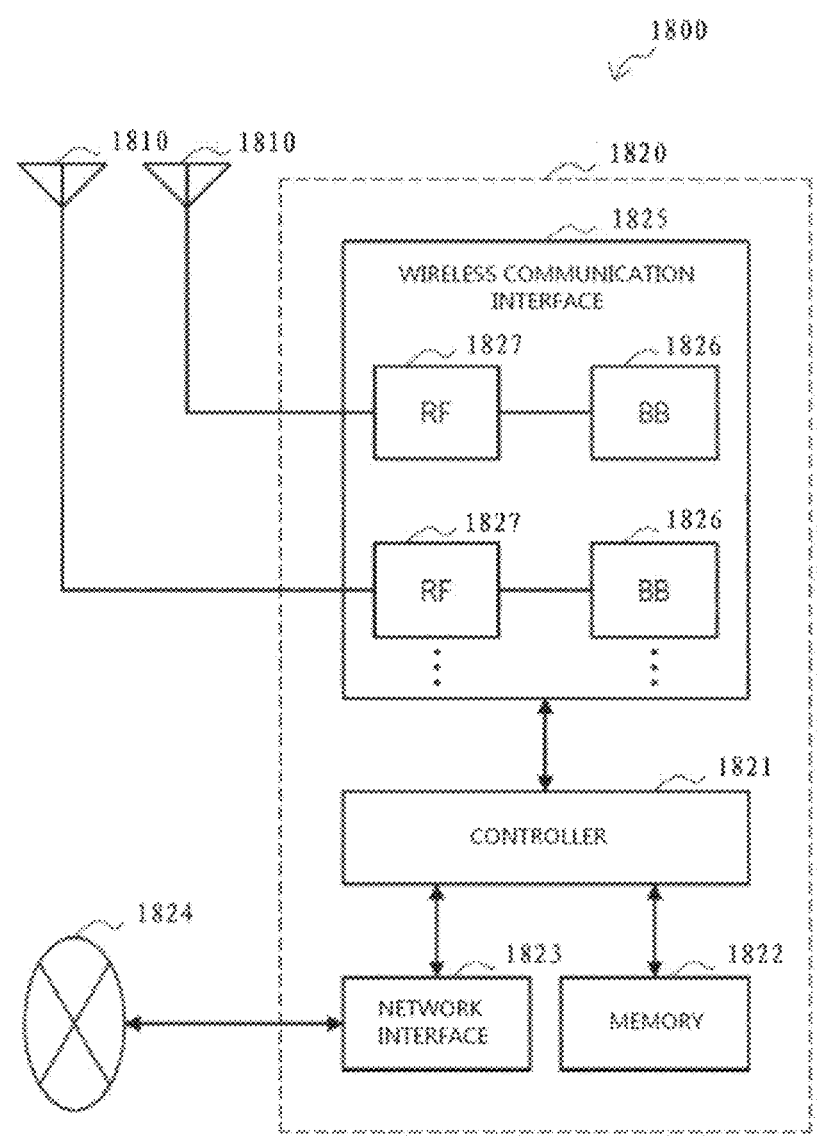
FIG. 18 is a block diagram showing a first example of a schematic configuration of an evolutional node (eNB) to which the technology according to the disclosure can be applied.

FIG. 18 is a block diagram showing a first example of schematic configuration of an eNB to which the technology according to the present disclosure can be applied. The eNB 1800 comprises one or more antennas 1810 and base station equipment 1820. The base station equipment 1820 and each antenna 1810 may be connected to each other via an RF cable.

Each of the antennas 1810 comprises a single or more antenna elements (such as a plurality of antenna elements included in a Multi-Input Multi-Output (MIMO) antenna), and is used for the base station equipment 1820 to transmit and receive a wireless signal. As shown in FIG. 18, the eNB 1800 may comprise a plurality of antennas 1810. For example, the plurality of antennas 1810 may be compatible with a plurality of frequency bands used by the eNB 1800. Although FIG. 18 shows an example in which the eNB 1800 comprises a plurality of antennas 1810, the eNB 1800 may also comprise a single antenna 1810.

The base station equipment 1820 may comprise a controller 1821, a memory 1822, a network interface 1823, and a wireless communication interface 1825.

The controller 1821 may be for example a CPU or a DSP, and manipulate various functions of a higher layer of the base station equipment 1820. For example, the controller 1821 generates data packets according to data in a signal processed by the wireless communication interface 1825, and transfers the generated packets via the network interface 1823. The controller 1821 may perform binding for data from a plurality of baseband processors to generate bound packets, and transfer the generated bound packets. The controller 1821 may have a logic function of executing control, which is such as radio resource control, radio bearer control, mobility management, admission rule and scheduling. The control may be executed in combination with a nearby eNB or a core network node. The memory 1822 comprises an RAM and an ROM, and stores programs executed by the controller 1821 and various types of control data (such as a terminal list, transmission power data, and scheduling data).

The network interface 1823 is a communication interface for connecting the base station equipment 1820 to a core network 1824. The controller 1821 may communicate with a core network node or another eNB via the network interface 1823. In this case, the eNB 1800 and the core network node or another eNB may be connected to each other via a logic interface (such as S1 interface and X2 interface). The network interface 1823 may also be a wired communication interface, or a wireless communication interface for a wireless backhaul. If the network interface 1823 is a wired communication interface, as compared with frequency bands used by the wireless communication interface 1825, the network interface 1823 may use higher frequency bands for wireless communication.

The wireless communication interface 1825 supports any cellular communication scheme (such as Long Term Evolution (LTE) and LTE-Advanced), and is provided with a wireless connection to a terminal located in a cell of the eNB 1800 via the antenna 1810. The wireless communication interface 1825 generally may comprise for example a Base-Band (BB) processor 1826 and an RF circuit 1827. The BB processor 1826 may execute for example coding/decoding, modulation/demodulation and multiplexing/demultiplexing, and execute various types of signal processing of layers (for example L1, Medium Access control (MAC), Radio Link Control (RLC) and Packet Data Convergence Protocol (PDCP)). Instead of the controller 1821, the BB processor 1826 may have part of all of the above logic function. The BB processor 1826 may be a memory which stores a communication control program, or a module comprising a processor configured to execute a program and a related circuit. The function of the BB processor 1826 may be changed through program updating. The module may be a card or blade inserted in a slot of the base station equipment 1820. Alternatively, the module may also be a chip installed on a card or blade. Meanwhile, the RF circuit 1827 may comprise for example a frequency mixer, a filter and an amplifier, and transmit and receive a wireless signal via the antenna 1810.

As shown in FIG. 18, the wireless communication interface 1825 may comprise a plurality of BB processors 1826. For example, the plurality of BB processors 1826 may be compatible with a plurality of frequency bands used by the eNB 1800. As shown in FIG. 18, the wireless communication interface 1825 may comprise a plurality of RF circuits 1827. For example, the plurality of RF circuits 1827 may be compatible with a plurality of antenna elements. Although FIG. 18 shows an example in which the wireless communication interface 1825 comprises a plurality of BB processors 1826 and a plurality of RF circuits 1827, the wireless communication interface 1825 may also comprise a single BB processor 1826 or a single RF circuit 1827.

Second Application Example

Figure 19:
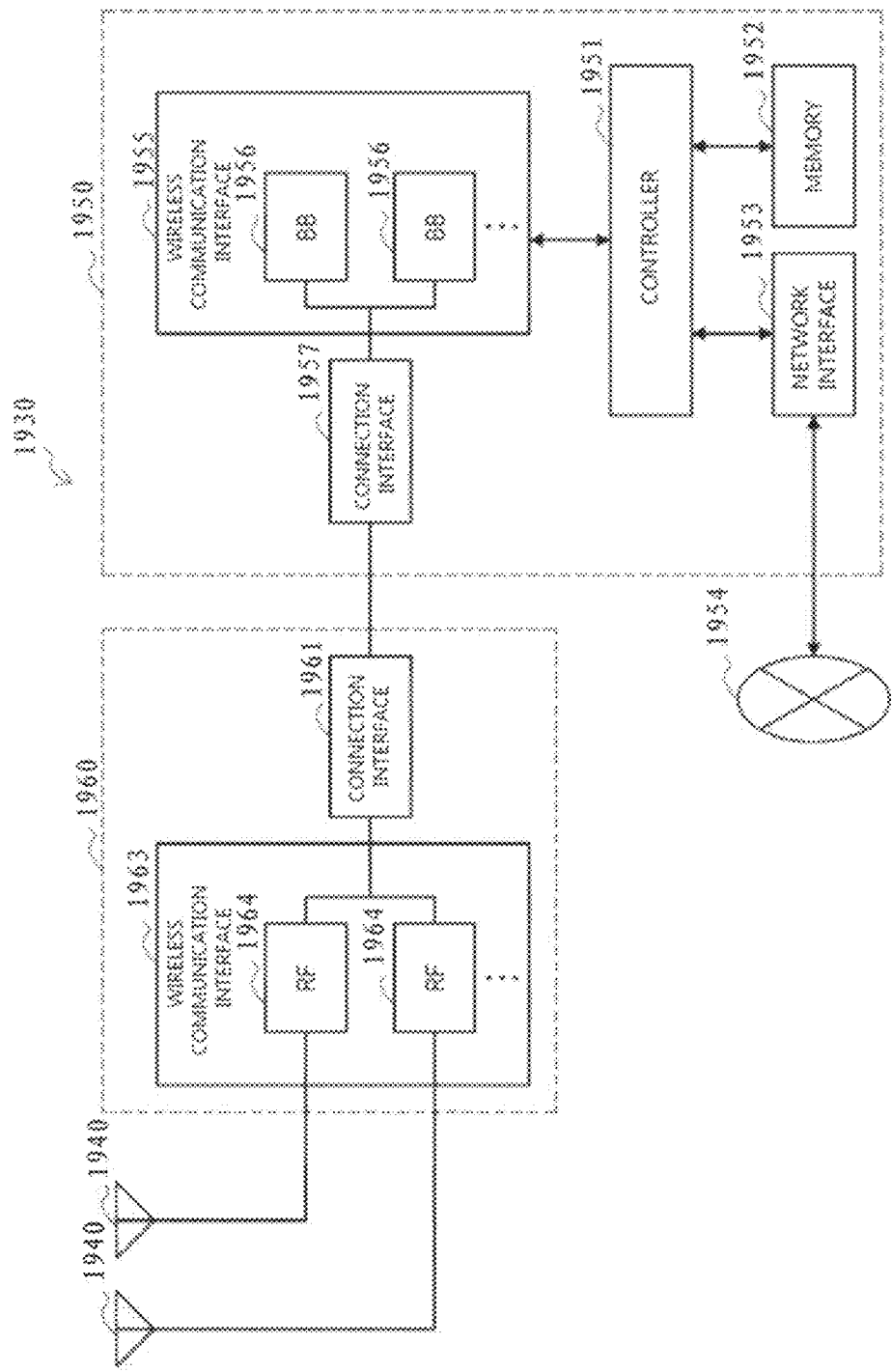
FIG. 19 is a block diagram showing a second example of a schematic configuration of an eNB to which the technology according to the present disclosure can be applied.

FIG. 19 is a block diagram showing a second example of schematic configuration of an eNB to which the technology according to the present disclosure can be applied. The eNB 1930 comprises a plurality of antennas 1940, base station equipment 1950, and an RRH 1960. The RRH 1960 and each antenna 1940 may be connected to each other via an RF cable. The base station equipment 1950 and the RRH 1960 may be connected to each other via a high-speed line such as an optical fiber cable.

Each of the antennas 1940 comprises a single or more antenna elements (such as a plurality of antenna elements included in an MIMO antenna) and is used for the RRH 1960 to transmit and receive a wireless signal. As shown in FIG. 19, the eNB 1930 may comprise a plurality of antennas 1940. For example, the plurality of antennas 1940 may be compatible with a plurality of frequency bands used by the eNB 1930. Although FIG. 19 shows an example in which the eNB 1930 comprises a plurality of antennas 1940, the eNB 1930 may also comprise a single antenna 1940.

The base station equipment 1950 comprises a controller 1951, a memory 1952, a network interface 1953, a wireless communication interface 1955, and a connection interface 1957. The controller 1951, the memory 1952 and the network interface 1953 are the same as the controller 1821, the memory 1822 and the network interface 1823 described with reference to FIG. 18.

The wireless communication interface 1955 supports any cellular communication scheme (such as LTE and LTE-Advanced), and is provided with a wireless connection to a terminal located in a sector corresponding to the RRH 1960 via the RRH 1960 and the antenna 1940. The wireless communication interface 1955 generally may comprise for example a BB processor 1956. The BB processor 1956 is the same as the BB processor 1826 described with reference to FIG. 18, except for that the BB processor 1956 is connected to the RF circuit 1964 of the RRH 1960 via the connection interface 1957. As shown in FIG. 19, the wireless communication interface 1955 may comprise a plurality of BB processors 1956. For example, the plurality of BB processors 1956 may be compatible with a plurality of frequency bands used by the eNB 1930. Although FIG. 19 shows an example in which the wireless communication interface 1955 comprises a plurality of BB processors 1956, the wireless communication interface 1955 may also comprise a single BB processor 1956.

The connection interface 1957 is an interface for connecting the base station equipment 1950 (the wireless communication interface 1955) to the RRH 1960. The connection interface 1957 may also be a communication module for communication in the above high-speed line for connecting the base station equipment 1950 (the wireless communication interface 1955) to the RRH 1960.

The RRH 1960 comprises a connection interface 1961 and a wireless communication interface 1963.

The connection interface 1961 is an interface for connecting the RRH 1960 (the wireless communication interface 1963) to the base station equipment 1950. The connection interface 1961 may also be a communication module for communication in the above high-speed line.

The wireless communication interface 1963 transmits and receives a wireless signal via the antenna 1940. The wireless communication interface 1963 generally may comprise for example an RF circuit 1964. The RF circuit 1964 may comprise for example a frequency mixer, a filter and an amplifier, and transmit and receive a wireless signal via the antenna 1940. As shown in FIG. 19, the wireless communication interface 1963 may comprise a plurality of RF circuits 1964. For example, the plurality of RF circuits 1964 may support a plurality of antenna elements. Although FIG. 19 shows an example in which the wireless communication interface 1963 comprises a plurality of RF circuits 1964, the wireless communication interface 1963 may also comprise a single RF circuit 1964.

In the eNB 1800 and the eNB 1930 as shown in FIG. 18 and FIG. 19, the communication interfaces in the foregoing electronic devices 800 and 900 may be realized by the wireless communication interface 1825 and the wireless communication interface 1955 and/or the wireless communication interface 1963. At least part of the functions of the reference signal configuration unit, the downlink control information generation unit, the codebook determining unit and the like may also be implemented by the controller 1821 and the controller 1951.

Application Examples Regarding User Equipment

First Application Example

Figure 20:
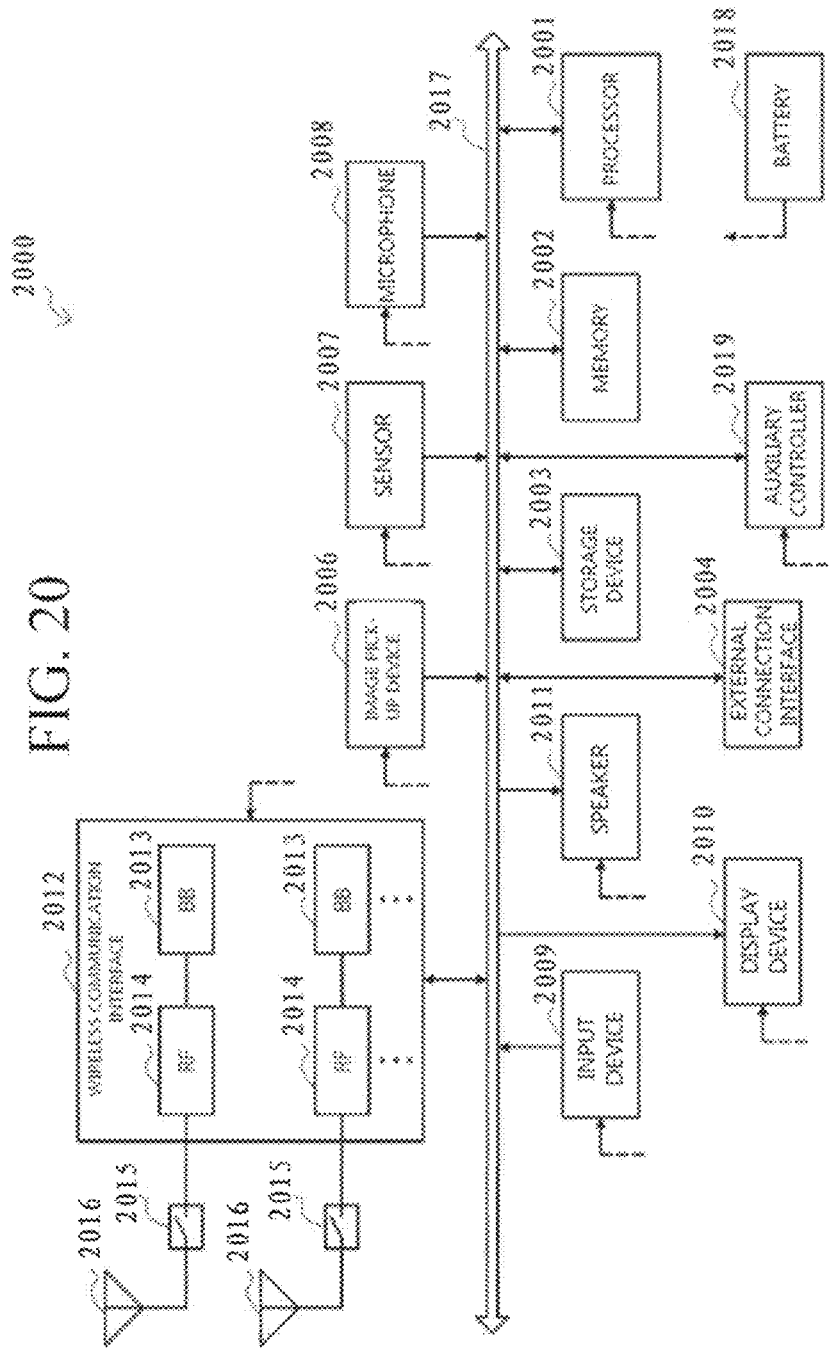
FIG. 20 is a block diagram showing an example of a schematic configuration of an intelligent telephone to which the technology according to the present disclosure can be applied.

FIG. 20 is a block diagram showing an example of schematic configuration of an intelligent telephone 2000 to which the technology according to the disclosure can be applied. The intelligent telephone 2000 comprises a processor 2001, a memory 2002, a storage device 2003, an external connection interface 2004, an image-pick up device 2006, a sensor 2007, a microphone 2008, an input device 2009, a display device 2010, a speaker 2011, a wireless communication interface 2012, one or more antenna switches 2015, one or more antennas 2016, a bus 2017, a battery 2018, and an auxiliary controller 2019.

The processor 2001 may be for example a CPU or a System on Chip (SoC), and control functions of an application layer and additional layers of the intelligent telephone 2000. The memory 2002 comprises an RAM and an ROM, and stores data and programs executed by the processor 2001. The storage device 2003 may comprise a storage medium, such as a semiconductor memory and a hard disc. The external connection interface 2004 is used for connecting an external device (such as a memory card and a Universal Serial Bus (USB) device) to an interface of the intelligent telephone 2000.

The image pick-up device 2006 comprises an image sensor (such as a Charge Coupled Device (CCD) and a Complementary Metal Oxide Semiconductor (CMOS)), and generates a captured image. The sensor 2007 may comprise a group of sensors, such as a measurement sensor, a gyro sensor, a geomagnetic sensor and an acceleration sensor. The microphone 2008 converts sound inputted to the intelligent telephone 2000 to an audio signal. The input device 2009 comprises for example a touch sensor configured to detect a touch on a screen of the display device 2010, a keypad, a keyboard, buttons or switches, and receives an operation or information inputted from a user. The display device 2010 comprises a screen (such as a Liquid Crystal Display (LCD) and an Organic Light-Emitting Diode (OLED) display), and displays an output image of the intelligent telephone 2000. The speaker 2011 converts the audio signal outputted from the intelligent telephone 2000 to sound.

The wireless communication interface 2012 supports any cellular communication scheme (such as LTE and LTE-Advanced), and executes wireless communication. The wireless communication interface 2012 generally may comprise for example a BB processor 2013 and an RF circuit 2014. The BB processor 2013 may execute for example coding/decoding, modulation/demodulation and multiplexing/demultiplexing, and execute various types of signal processing for wireless communication. Meanwhile, the RF circuit 2014 may comprise for example a frequency mixer, a filter and an amplifier, and transmit and receive a wireless signal via the antenna 2016. The wireless communication interface 2012 may be a chip module on which a BB processor 2013 and an RF circuit 2014 are integrated. As shown in FIG. 20, the wireless communication interface 2012 may comprise a plurality of BB processors 2013 and a plurality of RF circuits 2014. Although FIG. 20 shows an example in which the wireless communication interface 2012 comprises a plurality of BB processors 2013 and a plurality of RF circuits 2014, the wireless communication interface 2012 may also comprise a single BB processor 2013 or a single RF circuit 2014.

In addition, besides the cellular communication schemes, the wireless communication interface 2012 may support other types of wireless communication schemes, such as a Device-to-Device (D2D) communication scheme, a short range wireless communication scheme, a near field communication scheme and a wireless Local Area Network (LAN) scheme. In this case, the wireless communication interface 2012 may comprise a BB processor 2013 and an RF circuit 2014 for each wireless communication scheme.

Each of the antenna switches 2015 switches a connection destination of the antenna 2016 between a plurality of circuits included in the wireless communication interface 2012 (for example, circuits for different wireless communication schemes).

Each of the antennas 2016 comprises a single or more antenna elements (such as a plurality of antenna elements included in an MIMO antenna), and is used for the communication interface 2012 to transmit and receive a wireless signal. As shown in FIG. 20, the intelligent telephone 2000 may comprise a plurality of antennas 2016. Although FIG. 20 shows an example in which the intelligent telephone 2000 comprises a plurality of antennas 2016, the intelligent telephone 2000 may also comprise a single antenna 2016.

In addition, the intelligent telephone 2000 may comprise an antenna 2016 for each wireless communication scheme. In this case, the antenna switch 2015 may be omitted from the configuration of the intelligent telephone 2000.

The bus 2017 connects the processor 2001, the memory 2002, the storage device 2003, the external connection interface 2004, the image pick-up device 2006, the sensor 2007, the microphone 2008, the input device 2009, the display device 2010, the speaker 2011, the wireless communication interface 2012 and the auxiliary controller 2019 to each other. The battery 2018 supplies electric power to the respective blocks of the intelligent telephone 2000 as shown in FIG. 20 via feeder lines which are partially shown as dashed lines in the figure. The auxiliary controller 2019 for example manipulates the least necessary function of the intelligent telephone 2000 in a sleep mode.

In the intelligent telephone 2000 as shown in FIG. 20, the communication interfaces in the foregoing electronic devices 1000 and 1100 may be realized by the wireless communication interface 2012. At least part of the functions of the evaluation unit, the request unit and the generation unit may also be implemented by the processor 2001 or the auxiliary controller 2019.

Second Application Example

Figure 21:
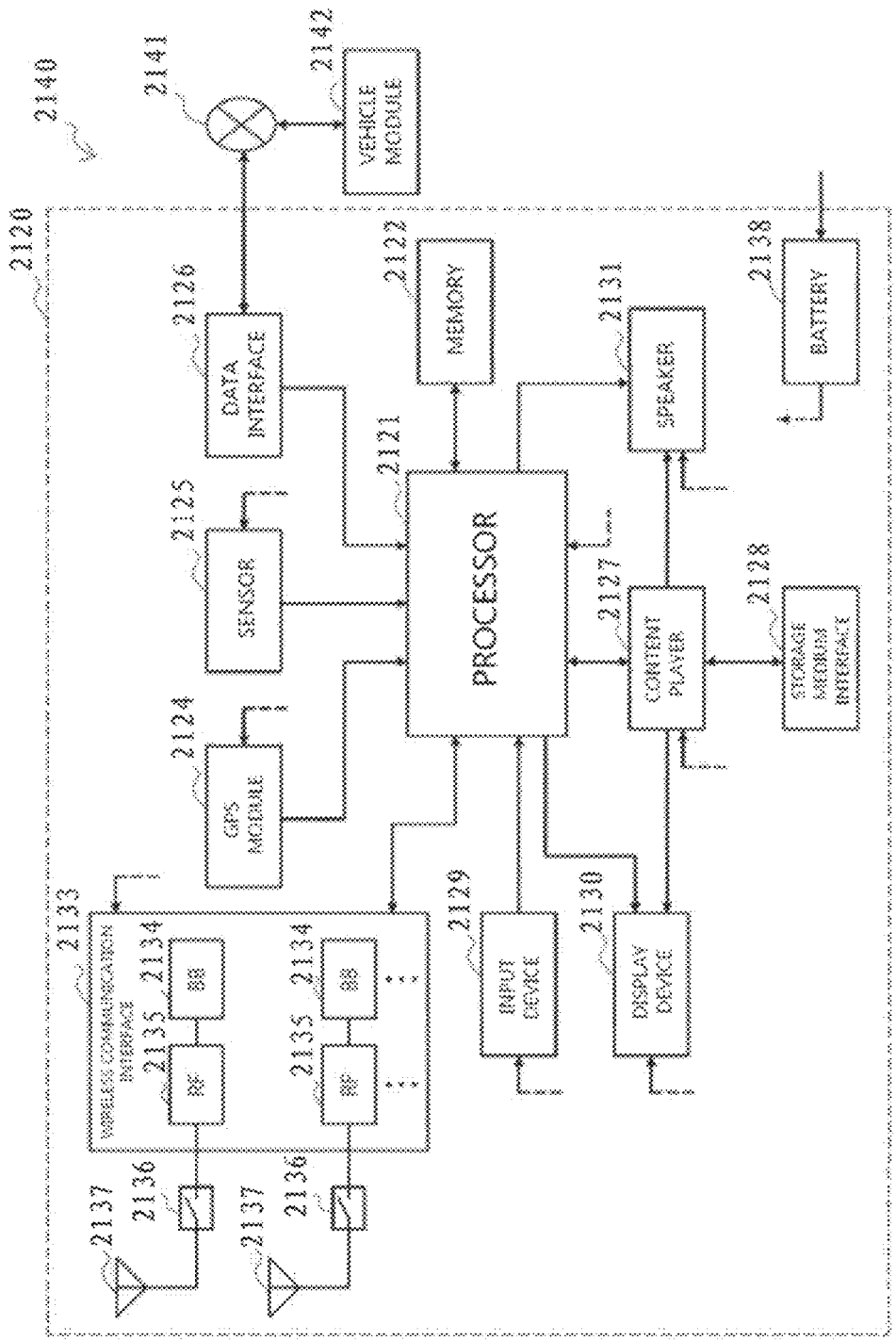
FIG. 21 is a block diagram showing an example of schematic configuration of an automobile navigation device to which the technology according to the present disclosure can be applied.

FIG. 21 is a block diagram showing an example of schematic configuration of an automobile navigation device 2120 to which the technology according to the present disclosure can be applied. The automobile navigation device 2120 comprises a processor 2121, a memory 2122, a Global Positioning system (GPS) module 2124, a sensor 2125, a data interference 2126, a content player 2127, a storage medium interface 2128, an input device 2129, a display device 2130, a speaker 2131, a wireless communication interface 2133, one or more antenna switches 2136, one or more antennas 2137, and a battery 2138.

The processor 2121 may be for example a CPU or a SoC, and controls a navigation function and additional functions of the automobile navigation device 2120. The memory 2122 comprises an RAM and an ROM, and stores data and programs executed by the processor 2121.

The GPS module 2124 measures a position (such as longitude, latitude and height) of the automobile navigation device 2120 by using a GPS signal received from a GPS satellite. The sensor 2125 may comprise a group of sensors, such as a gyro sensor, a geomagnetic sensor and an air pressure sensor. The data interface 2126 is connected to for example an in-vehicle network 2141 via a terminal which is not shown, and acquires data (such as vehicle speed data) generated by a vehicle.

The content player 2127 reproduces content stored in a storage medium (such as a CD and a DCD). The storage medium is inserted in the storage medium interface 2128. The input device 2129 comprises for example a touch sensor configured to detect a touch on a screen of the display device 2130, buttons or switches, and receives an operation or information inputted from a user. The display device 2130 comprises a screen such as an LCD or an OLED display, and displays an image of the navigation function or the reproduced content. The speaker 2131 outputs sound of the navigation function or the reproduced content.

The wireless communication interface 2133 supports any cellular communication scheme (such as LTE and LTE-Advanced), and executes wireless communication. The wireless communication interface 2133 generally may comprise for example a BB processor 2134 and an RF circuit 2135. The BB processor 2134 may execute for example coding/decoding, modulation/demodulation and multiplexing/demultiplexing, and execute various types of signal processing for wireless communication. Meanwhile, the RF circuit 2135 may comprise for example a frequency mixer, a filter and an amplifier, and transmit and receive a wireless signal via the antenna 2137. The wireless communication interface 2133 may also be a chip module on which a BB processor 2134 and an RF circuit 2135 are integrated. As shown in FIG. 21, the wireless communication interface 2133 may comprise a plurality of BB processors 2134 and a plurality of RF circuits 2135. Although FIG. 21 shows an example in which the wireless communication interface 2133 comprises a plurality of BB processors 2134 and a plurality of RF circuits 2135, the wireless communication interface 2133 may also comprise a single BB processor 2134 or a single RF circuit 2135.

In addition, besides the cellular communication schemes, the wireless communication interface 2133 may support other types of wireless communication schemes, such as a Device-to-Device (D2D) communication scheme, a short range wireless communication scheme, a near field communication scheme and a wireless LAN scheme. In this case, for each wireless communication scheme, the wireless communication interface 2133 may comprise a BB processor 2134 and an RF circuit 2235.

Each of the antenna switches 2136 switches a connection destination of the antenna 2137 between a plurality of circuits included in the wireless communication interface 2133 (for example, circuits for different wireless communication schemes).

Each of the antennas 2137 comprises a single or more antenna elements (such as a plurality of antenna elements included in an MIMO antenna), and is used for the communication interface 2133 to transmit and receive a wireless signal. As shown in FIG. 21, the automobile navigation device 2120 may comprise a plurality of antennas 2137. Although FIG. 21 shows an example in which the automobile navigation device 2120 comprises a plurality of antennas 2137, the automobile navigation device 2120 may also comprise a single antenna 2137.

In addition, the automobile navigation device 2120 may comprise an antenna 2137 for each wireless communication scheme. In this case, the antenna switch 2136 may be omitted from the configuration of the automobile navigation device 2120.

The battery 2138 supplies electric power to the respective blocks of the automobile navigation device 2120 as shown in FIG. 21 via feeder lines which are partially shown as dashed lines in the figure. The battery 2138 accumulates the electric power supplied from the vehicle.

In the automobile navigation device 2120 as shown in FIG. 21, the communication interfaces in the foregoing electronic devices 1000 and 1100 may be realized by the wireless communication interface 2133. At least part of the functions of the evaluation unit, the determination unit and the generation unit may also be implemented by the processor 2121.

The technology of the disclosure may also be realized as an in-vehicle system (or vehicle) 2140 comprising one or more of the following blocks: the automobile navigation device 2120, the in-vehicle network 2141 and a vehicle module 2142. The vehicle module 2142 generates vehicle data (such as vehicle speed, engine speed and fault information), and outputs the generated data to the in-vehicle network 2141.

Preferred embodiments of the present disclosure have been described above with reference to the drawings. However, the disclosure of course is not limited to the above examples. Those skilled in the art can obtain various alterations and modifications within the scope of the appended claims, and it should be understood that these alterations and modifications naturally will fall within the technical scope of the disclosure.

For example, in the foregoing embodiments, a plurality of functions incorporated in one unit may be implemented by separate devices. Alternatively, in the foregoing embodiments, a plurality of functions implemented by a plurality of units may be implemented by separate devices, respectively. In addition, one of the foregoing functions may be implemented by a plurality of units. Undoubtedly, such configuration is included within the technical scope of the disclosure.

In the specification, the steps described in the flowcharts not only include processing executed in the order according to a time sequence but also include processing executed in parallel or separately but not necessarily according to a time sequence. In addition, even if in steps in which processing is executed according to a time sequence, the order undoubtedly still can be appropriately changed.

Although the present disclosure and the advantages thereof have been described in detail, it should be understood that various alterations, substitutions or transformations may be made without departing from the spirit and the scope of the present disclosure as defined by the appended claims. Moreover, terms "include" and "comprise" or any other variants thereof in the embodiments of the present disclosure are intended to cover non-exclusive inclusion, such that a process, a method, an article or an apparatus including a series of elements not only includes those elements but also includes other elements not explicitly listed or but also includes elements intrinsic to such a process, method, article or apparatus. In the absence of more limitations, elements defined by expression "including one . . . " do not exclude further existence of other identical elements in a process, a method, an article or an apparatus including the elements.

The invention claimed is:

1. An electronic device at a user equipment end in a wireless communication system, the electronic device comprising processing circuitry configured to:
   estimate and report wideband channel state information to a base station in response to a wideband reference signal from the base station;
   determine whether a communication quality between the user equipment and the base station is lower than a predetermined threshold;
   transmit a quality report, in a case where it is determined that the communication quality is lower than the predetermined threshold, to the base station; and
   receive, from the base station, subband reference signal and an estimation instruction for indication the electronic device to estimate subband channel state based on the subband reference signal;
   generate subband channel state information to be sent to the base station according to the subband reference signal, for the base station to determine an effective precoding codebook based on the subband channel state information.

2. The electronic device according to claim 1, the electronic device further comprising a transceiver configured to:
   transmit the subband channel state information to the base station; and
   receive downlink control information from the base station;
   the processing circuitry further configured to generate, in response to the downlink control information, the subband channel state information.

3. The electronic device according to claim 1, wherein the subband channel state information includes subband channel quality indicator (CQI) or subband precoding matrix indicator (PMI).

4. The electronic device according to claim 1, wherein the subband reference signal comprises Channel State Information-Reference Signal CSI-RS.

5. The electronic device according to claim 1, wherein the subband channel reference signal corresponds to one or more subband channels of a wideband corresponding to the wideband reference signal.

6. A method implemented with processing circuitry at an electronic device at a user equipment end in a wireless communication system, the method comprising:
   estimating and reporting wideband channel state information to a base station in response to a wideband reference signal from the base station;
   determining whether a communication quality between the user equipment and the base station is lower than a predetermined threshold;
   transmitting a quality report, in a case where it is determined that the communication quality is lower than the predetermined threshold, to the base station; and
   receiving, from the base station, subband reference signal and an estimation instruction for indication the electronic device to estimate subband channel state based on the subband reference signal;
   generating subband channel state information to be sent to the base station according to the subband reference signal, for the base station to determine an effective precoding codebook based on the subband channel state information.

7. The method according to claim 6, further comprising transmitting with a transceiver the subband channel state information to the base station; receiving via the transceiver downlink control information from the base station; and
   generating, in response to the downlink control information, the subband channel state information.

8. The method according to claim 6, wherein the subband channel state information includes subband channel quality indicator (CQI) or subband precoding matrix indicator (PMI).

9. The method according to claim 6, wherein the subband reference signal comprises Channel State Information-Reference Signal CSI-RS.

10. The method according to claim 6, wherein the subband channel reference signal corresponds to one or more subband channels of a wideband corresponding to the wideband reference signal.

* * * * *